United States Patent
Chendamarai Kannan et al.

(10) Patent No.: US 11,019,605 B2
(45) Date of Patent: May 25, 2021

(54) RESERVATION REPETITION FOR DEAFNESS AVOIDANCE

(71) Applicant: QUALCOMM Incorporated, San Diego, CA (US)

(72) Inventors: Arumugam Chendamarai Kannan, San Diego, CA (US); Sanaz Barghi, Carlsbad, CA (US); Aleksandar Damnjanovic, Del Mar, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/144,539

(22) Filed: Sep. 27, 2018

(65) Prior Publication Data
US 2019/0104514 A1 Apr. 4, 2019

Related U.S. Application Data

(60) Provisional application No. 62/566,016, filed on Sep. 29, 2017.

(51) Int. Cl.
| | |
|---|---|
| *H04W 72/04* | (2009.01) |
| *H04W 74/08* | (2009.01) |
| *H04W 74/00* | (2009.01) |
| *H04L 5/00* | (2006.01) |
| *H04W 72/08* | (2009.01) |
| *H04W 28/26* | (2009.01) |
| *H04L 1/00* | (2006.01) |

(Continued)

(52) U.S. Cl.
CPC ........ *H04W 72/0413* (2013.01); *H04L 1/00* (2013.01); *H04L 1/08* (2013.01); *H04L 5/001* (2013.01);

(Continued)

(58) Field of Classification Search
None
See application file for complete search history.

(56) References Cited

U.S. PATENT DOCUMENTS

| | | | |
|---|---|---|---|
| 8,611,940 B2* | 12/2013 | Jain ...................... | H04B 7/0695 455/509 |
| 10,536,973 B2* | 1/2020 | Yang ...................... | H04L 27/26 |

(Continued)

OTHER PUBLICATIONS

International Search Report and Written Opinion—PCT/US2018/053409—ISA/EPO —dated Feb. 1, 2019.

(Continued)

*Primary Examiner* — Steve R Young
(74) *Attorney, Agent, or Firm* — Liem T. Do

(57) ABSTRACT

Methods, systems, and devices for wireless communications are described. A receiving wireless device may determine that a data communication is scheduled for the wireless device on a channel of a shared radio frequency spectrum band during a transmission opportunity (TxOP) spanning a plurality of slots. The receiving wireless device may identify a subset of slots from the plurality of slots, wherein the subset of slots is associated with a channel reservation signal by the wireless device. The receiving wireless device may receive the data communication at the wireless device during the TxOP using a beam configuration. The receiving wireless device may perform repeated transmissions of the channel reservation signal based at least in part on the beam configuration during the subset of slots and within a time period associated with receiving the data communication.

30 Claims, 16 Drawing Sheets

(51) Int. Cl.
*H04L 1/08* (2006.01)
*H04L 5/14* (2006.01)
*H04L 1/18* (2006.01)

(52) U.S. Cl.
CPC .......... *H04L 5/0023* (2013.01); *H04L 5/0048* (2013.01); *H04L 5/0053* (2013.01); *H04L 5/0073* (2013.01); *H04L 5/0091* (2013.01); *H04W 28/26* (2013.01); *H04W 72/0446* (2013.01); *H04W 72/082* (2013.01); *H04W 74/004* (2013.01); *H04L 1/1812* (2013.01); *H04L 5/14* (2013.01); *H04W 74/0816* (2013.01)

(56) References Cited

U.S. PATENT DOCUMENTS

| | | | | |
|---|---|---|---|---|
| 2012/0113952 | A1* | 5/2012 | Kneckt | H04W 72/0406 370/330 |
| 2013/0203429 | A1* | 8/2013 | Kneckt | H04W 72/1263 455/450 |
| 2015/0250002 | A1* | 9/2015 | Sun | H04W 74/0808 370/329 |
| 2016/0044711 | A1* | 2/2016 | Lou | H04W 74/0816 370/338 |
| 2016/0192395 | A1* | 6/2016 | Yoo | H04W 74/0808 370/329 |
| 2017/0171887 | A1* | 6/2017 | Shi | H04W 16/14 |
| 2017/0202022 | A1 | 7/2017 | Chendamarai et al. | |
| 2018/0020485 | A1* | 1/2018 | Yang | H04L 1/1896 |
| 2019/0182866 | A1* | 6/2019 | Li | H04W 72/121 |
| 2020/0120458 | A1* | 4/2020 | Aldana | H04W 28/22 |

OTHER PUBLICATIONS

Partial International Search Report—PCT/US2018/053409—ISA/EPO—dated Dec. 7, 2018.

* cited by examiner

RESERVATION REPETITION FOR DEAFNESS AVOIDANCE

CROSS REFERENCES

The present Application for Patent claims the benefit of U.S. Provisional Patent Application No. 62/566,016 by CHENDAMARAI KANNAN et al., entitled "RESERVATION REPETITION FOR DEAFNESS AVOIDANCE," filed Sep. 29, 2017, assigned to the assignee hereof, and expressly incorporated herein by reference in its entirety.

BACKGROUND

The following relates generally to wireless communication, and more specifically to reservation repetition for deafness avoidance.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

Millimeter wave wireless communication systems, while promising, present new challenges to old questions. Conventional considerations in developing wireless communication systems focus primarily on avoiding interference between communication devices, often at the expense of reuse. Thus, devices would elect to avoid transmitting out of concerns for interfering with neighboring devices, and the associated transmission opportunity would be wasted. Interference in a mmW wireless communication system, however, is different than in a non-mmW wireless communication system, e.g., such as within a conventional cell coverage area of a base station. For example, beamformed transmissions may have varying beam configurations such that each beam may have a different beam width, a different beam direction, etc. Generally, a narrow beam width may have a relative deep, but narrow coverage area whereas a wider beam width may have a relative shallow, but wide coverage area. The "coverage area" (or footprint) within the context of a beamformed transmission may vary from one transmission to the next. Detecting the presence (e.g., for interference detection/avoidance, capturing the medium, and the like) of a narrow beam width may be difficult for a device to the left or right of the narrow beam coverage area. Similarly, detecting the presence of a wider beam may be difficult for a device just outside of the wide, but shallow coverage area. Thus, the directionality and configuration of transmit and receive beams provide a certain level of interference isolation in a mmW wireless communication systems. Conventional interference detection/medium access techniques would likely fail in such circumstances.

SUMMARY

The described techniques relate to improved methods, systems, devices, or apparatuses that support reservation repetition for deafness avoidance. Generally, the described techniques provide for a receiving wireless device, such as a base station and/or a UE, to repeat transmissions on a receiver beam and, for a transmitting wireless device, to wait a minimum listening interval (or time) before capturing the medium for transmission. For example, the receiving wireless device may be receiving a data communication from another wireless device. The data communication may be received across multiple symbols, slots, mini-slots, and the like. The receiving wireless device may identify a subset of the symbols, slot, etc., and the perform repeated transmissions of a reservation signal (or any signal acting as a reservation signal) in the subset of symbols, slots, etc. The repeated transmissions may act to notify other wireless devices that the channel is occupied during the data communication transmission opportunity (TxOP), e.g., for neighboring wireless devices that may have missed the initial channel reservation messages due to deafness.

Additionally or alternatively, a transmitting wireless device may wait one or more instances of a threshold listening time before attempting to grab the channel. For example, the transmitting wireless device may determine that data is scheduled for a neighboring wireless device. The transmitting wireless device may have data available for transmission to another wireless device (e.g., an associated UE or base station) and therefore identify a minimum listening time (or threshold listen time) to use for a channel access procedure on the channel. The transmitting wireless device may perform the channel access procedure to capture the medium, which includes monitoring the channel for one or more instances of the minimum listening time. Provided the channel is clear, e.g., no reservation signals or energy is detected during the minimum listening time, the transmitting wireless device may reserve the channel for the data communication to its associated wireless device.

A method of wireless communication is described. The method may include determining that a data communication is scheduled for the wireless device on a channel of a shared radio frequency spectrum band during a TxOP spanning a plurality of slots, identifying a subset of slots from the plurality of slots, wherein the subset of slots is associated with a channel reservation signal by the wireless device, receiving the data communication at the wireless device during the TxOP using a beam configuration, and performing, by the wireless device, repeated transmissions of the channel reservation signal based at least in part on the beam configuration during the subset of slots and within a time period associated with receiving the data communication.

An apparatus for wireless communication is described. The apparatus may include means for determining that a data communication is scheduled for the wireless device on a channel of a shared radio frequency spectrum band during a TxOP spanning a plurality of slots, means for identifying a subset of slots from the plurality of slots, wherein the subset of slots is associated with a channel reservation signal by the wireless device, means for receiving the data communication at the wireless device during the TxOP using a beam configuration, and means for performing, by the wireless device, repeated transmissions of the channel reservation signal based at least in part on the beam configuration during the subset of slots and within a time period associated with receiving the data communication.

Another apparatus for wireless communication is described. The apparatus may include a processor, memory in electronic communication with the processor, and instructions stored in the memory. The instructions may be operable to cause the processor to determine that a data communication is scheduled for the wireless device on a channel of a shared radio frequency spectrum band during a TxOP spanning a plurality of slots, identify a subset of slots from the plurality of slots, wherein the subset of slots is associated with a channel reservation signal by the wireless device, receive the data communication at the wireless device during the TxOP using a beam configuration, and perform, by the wireless device, repeated transmissions of the channel reservation signal based at least in part on the beam configuration during the subset of slots and within a time period associated with receiving the data communication.

A non-transitory computer-readable medium for wireless communication is described. The non-transitory computer-readable medium may include instructions operable to cause a processor to determine that a data communication is scheduled for the wireless device on a channel of a shared radio frequency spectrum band during a TxOP spanning a plurality of slots, identify a subset of slots from the plurality of slots, wherein the subset of slots is associated with a channel reservation signal by the wireless device, receive the data communication at the wireless device during the TxOP using a beam configuration, and perform, by the wireless device, repeated transmissions of the channel reservation signal based at least in part on the beam configuration during the subset of slots and within a time period associated with receiving the data communication.

Some examples of the method, apparatus, and non-transitory computer-readable medium described above may further include processes, features, means, or instructions for receiving an indication of a plurality of gap periods within the TxOP, wherein the subset of slots may be identified based at least in part on the indication.

In some examples of the method, apparatus, and non-transitory computer-readable medium described above, the indication may be received in at least one of: a control signal received from a base station, or in a radio resource control (RRC) signal received from the base station, or in a multi-subframe downlink grant received from the base station.

Some examples of the method, apparatus, and non-transitory computer-readable medium described above may further include processes, features, means, or instructions for puncturing the subset of slots with the repeated transmissions of the channel reservation signals.

Some examples of the method, apparatus, and non-transitory computer-readable medium described above may further include processes, features, means, or instructions for performing an on-demand listen-before-talk (OD-LBT) procedure on the channel prior to puncturing the subset of slots.

Some examples of the method, apparatus, and non-transitory computer-readable medium described above may further include processes, features, means, or instructions for receiving a request for a plurality of gap periods configured within the TxOP, wherein the subset of slots may be identified based at least in part on the request.

In some examples of the method, apparatus, and non-transitory computer-readable medium described above, the request may be received in at least one of: a control signal received from a base station, or in an RRC signal received from the base station, or in a multi-subframe uplink grant received from the base station.

In some examples of the method, apparatus, and non-transitory computer-readable medium described above, the request may be received based at least in part on at least one of: a LBT procedure performed on the channel, a transmission rank associated with the data communication, or a combination thereof Some examples of the method, apparatus, and non-transitory computer-readable medium described above may further include processes, features, means, or instructions for identifying a new radio (NR) frame structure associated with the data communications, wherein the subset of slots may be identified based at least in part on the NR frame structure.

Some examples of the method, apparatus, and non-transitory computer-readable medium described above may further include processes, features, means, or instructions for multiplexing in at least one of: a time domain, a frequency domain, or a combination thereof, one or more transmissions of uplink control information (UCI) with the repeated transmissions of the channel reservation signal.

Some examples of the method, apparatus, and non-transitory computer-readable medium described above may further include processes, features, means, or instructions for multiplexing in at least one of: a time domain, a frequency domain, or a combination thereof, one or more transmissions of downlink control signaling with the repeated transmissions of the channel reservation signal.

In some examples of the method, apparatus, and non-transitory computer-readable medium described above, the downlink control signaling comprises at least one of: a physical downlink control channel (PDCCH) grant, or an override of a previous PDCCH grant, or a new or updated modulation and coding scheme (MCS), or a new or updated rank indicator, or a new or updated TxOP length, or a new or updated frame format indicator, or a new or updated resource allocation, or combinations thereof.

Some examples of the method, apparatus, and non-transitory computer-readable medium described above may further include processes, features, means, or instructions for configuring each instance of the channel reservation signal with an end time period associated with the data communication, wherein the end time period comprises at least one of: an absolute time identifying the end of the data communication or a relative time period based at least in part on a timing of the transmission of the channel reservation signal with respect to the end of the data communication.

Some examples of the method, apparatus, and non-transitory computer-readable medium described above may further include processes, features, means, or instructions for configuring each instance of the channel reservation signal with at least one of: an acceptable interference level indication, an acceptable interference rank indication, or a combination thereof.

In some examples of the method, apparatus, and non-transitory computer-readable medium described above, the beam configuration for the repeated transmissions of the channel reservation signal comprises the same beam configuration used for the data communication.

In some examples of the method, apparatus, and non-transitory computer-readable medium described above, the beam configuration for the repeated transmissions of the channel reservation signal comprises a different beam configuration used for the data communication.

A method of wireless communication is described. The method may include determining that a data transmission to a second wireless device is scheduled on a channel of a shared radio frequency spectrum band, identifying a threshold listen time associated with a channel access procedure for the channel of the shared radio frequency spectrum band, and performing, prior to the data transmission to the second wireless device, the channel access procedure on the channel of the shared radio frequency spectrum band, wherein the channel access procedure comprises monitoring the channel using a beam configuration associated with the data transmission, the monitoring occurring for at least one or more consecutive instances of the identified threshold listen time.

An apparatus for wireless communication is described. The apparatus may include means for determining that a data transmission to a second wireless device is scheduled on a channel of a shared radio frequency spectrum band, means for identifying a threshold listen time associated with a channel access procedure for the channel of the shared radio frequency spectrum band, and means for performing, prior to the data transmission to the second wireless device, the channel access procedure on the channel of the shared radio frequency spectrum band, wherein the channel access procedure comprises monitoring the channel using a beam configuration associated with the data transmission, the monitoring occurring for at least one or more consecutive instances of the identified threshold listen time.

Another apparatus for wireless communication is described. The apparatus may include a processor, memory in electronic communication with the processor, and instructions stored in the memory. The instructions may be operable to cause the processor to determine that a data transmission to a second wireless device is scheduled on a channel of a shared radio frequency spectrum band, identify a threshold listen time associated with a channel access procedure for the channel of the shared radio frequency spectrum band, and perform, prior to the data transmission to the second wireless device, the channel access procedure on the channel of the shared radio frequency spectrum band, wherein the channel access procedure comprises monitoring the channel using a beam configuration associated with the data transmission, the monitoring occurring for at least one or more consecutive instances of the identified threshold listen time.

A non-transitory computer-readable medium for wireless communication is described. The non-transitory computer-readable medium may include instructions operable to cause a processor to determine that a data transmission to a second wireless device is scheduled on a channel of a shared radio frequency spectrum band, identify a threshold listen time associated with a channel access procedure for the channel of the shared radio frequency spectrum band, and perform, prior to the data transmission to the second wireless device, the channel access procedure on the channel of the shared radio frequency spectrum band, wherein the channel access procedure comprises monitoring the channel using a beam configuration associated with the data transmission, the monitoring occurring for at least one or more consecutive instances of the identified threshold listen time.

Some examples of the method, apparatus, and non-transitory computer-readable medium described above may further include processes, features, means, or instructions for determining that an OD-LBT procedure may be enabled on the channel, wherein the threshold listen time may be identified based at least in part on the OD-LBT procedure being enabled.

Some examples of the method, apparatus, and non-transitory computer-readable medium described above may further include processes, features, means, or instructions for determining that a new beam configuration may be being used for the channel access procedure, wherein the threshold listen time may be identified based at least in part on the new beam configuration.

Some examples of the method, apparatus, and non-transitory computer-readable medium described above may further include processes, features, means, or instructions for receiving an indication from a third wireless device that an OD-LBT procedure may be enabled on the channel, wherein the threshold listen time may be identified based at least in part on the OD-LBT procedure being enabled.

In some examples of the method, apparatus, and non-transitory computer-readable medium described above, the indication during the OD-LBT procedure of the third wireless device, wherein the indication identifies the threshold listen time.

In some examples of the method, apparatus, and non-transitory computer-readable medium described above, monitoring the channel comprises at least one of: monitoring the channel for a channel reservation signal or monitoring the channel for a threshold amount of energy.

In some examples of the method, apparatus, and non-transitory computer-readable medium described above, a first threshold listen time may be identified when the first wireless device comprises a base station and a second threshold listen time may be identified when the first wireless device comprises a user equipment (UE).

Some examples of the method, apparatus, and non-transitory computer-readable medium described above may further include processes, features, means, or instructions for monitoring the channel for a channel reservation signal over a plurality of slots.

DETAILED DESCRIPTION

Figure 1:
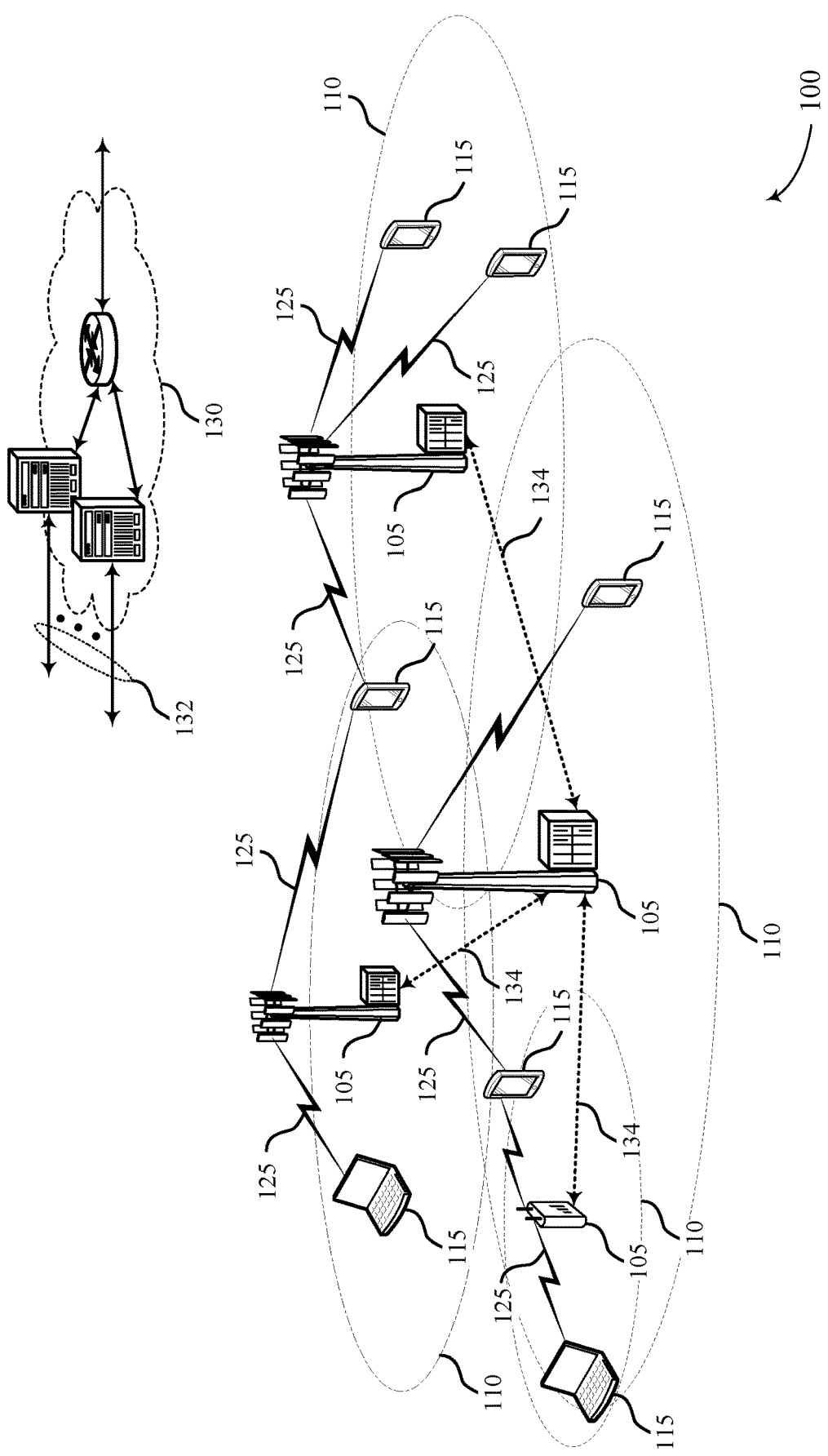
FIG. 1 illustrates an example of a system for wireless communication that supports reservation repetition for deafness avoidance in accordance with aspects of the present disclosure.

Next generation wireless communication systems may rely on millimeter wave (mmW) communication technologies. mmW technologies typically use beamformed transmissions/receptions to provide directional communications. Each beamformed transmission/reception may have an associated beam configuration, such as a beam width, a beamforming configuration, a beam shape, and the like. A transmit beam may refer to a digital/analog antenna configuration that provides a directional transmission towards a receiving device, such as a user equipment (UE). A receive beam may refer to a digital/analog antenna configuration that provides directional reception of a beam from a transmitting device. For a beam pair used for wireless communications, the transmit beam may be the same as or different from the receive beam (e.g., due to beam reflection, diffraction, and the like).

Millimeter wave wireless communication systems present unique challenges with respect to interference management, medium access, and the like. For example, the directionality of transmissions and/or receptions prove a certain level of interference isolation in mmW systems. Moreover, mmW communications in an asynchronous (or partially synchronized) network also introduce unique challenges. Conventional design techniques may opt for transmission restraint to avoid interference, which may minimize channel reuse and lead to wasted resources.

Aspects of the disclosure are initially described in the context of a wireless communications system. Aspects of the disclosure provide varying techniques that, individually or in combination, support reservation repetition for deafness avoidance in a mmW channel access procedure, such as an LBT procedure.

Aspects of the disclosure are further illustrated by and described with reference to apparatus diagrams, system diagrams, and flowcharts that relate to reservation repetition for deafness avoidance. In some aspects, a wireless device (e.g., a UE and/or a base station) may be considered a receiving wireless device in that data communications is scheduled for the wireless device on a channel of a shared radio frequency spectrum band. The data communication may be scheduled during a transmission opportunity (TxOP) that spans multiple time periods, e.g., symbol periods, slots, mini-slots, self-contained slots, subframes, and the like. For ease of reference, the time periods may be referred to simply as slots. The receiving wireless device may receive the data communications during the TxOP and, during the TxOP, transmit multiple instances of a signal reserving the channel (e.g., a channel reservation signal, or some other suitable signal). In some aspects, the repeated transmissions of the channel reservation signal may provide an indication to other wireless devices (e.g., wireless devices other than the transmitting and receiving wireless devices) advertising that the channel is occupied for the data communications. The receiving wireless device may use a beam configuration for the repeated transmissions of the channel reservation signal that corresponds, at least in some aspects, to a receive beam and/or transmit beam configuration being used for the data communications. This may aid the other wireless devices when scheduling their own data communications on the channel, e.g., to avoid interference.

In some aspects, a transmitting wireless device (e.g., a UE and/or a base station) may use multiple instances of a listening time during a channel access procedure before scheduling the channel for a data communication. For example, the wireless device may be considered a transmitting wireless device in that it has data communications scheduled for another wireless device (e.g., a receiving wireless device). The transmitting wireless device may determine that the data communications are scheduled for the other wireless device and, based on the data communications, identify a threshold listen time to be used during the channel access procedure. The transmitting wireless device may perform a channel access procedure, e.g., an LBT procedure, that includes monitoring the channel for multiple instances of the listening time. The transmitting wireless device may use a beam configuration to monitor the channel that corresponds, at least in some aspects, to a receive beam and/or transmit beam configuration being used for the data communications. The transmitting wireless device may determine that the channel access procedure is successful based on an energy level detected on the channel (e.g., over multiple slots), based on other channel reservation signals, and the like. If the channel is determined available, the transmitting wireless device may exchange various channel reservation messages in order to capture the channel for the data communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A wireless device may be considered a receiving wireless device in that the device has data communications scheduled for it, e.g., a base station 105 or a UE 115. The receiving wireless device may determine that a data communication is scheduled for the wireless device on a channel of a shared radio frequency spectrum band during a TxOP spanning a plurality of slots. The receiving wireless device may identify a subset of slots from the plurality of slots, wherein the subset of slots is associated with a channel reservation signal by the wireless device. The receiving wireless device may receive the data communication at the wireless device during the TxOP using a beam configuration. The receiving wireless device may perform repeated transmissions of the channel reservation signal based at least in part on the beam configuration during the subset of slots and within a time period associated with receiving the data communication.

A wireless device may be considered a transmitting wireless device in that the device has data communications scheduled for communicating to a second wireless device, e.g., a base station 105 or a UE 115. The transmitting wireless device may determine that a data transmission to a second wireless device is scheduled on a channel of a shared radio frequency spectrum band. The transmitting wireless device (e.g., first wireless device) may identify a threshold listen time associated with a channel access procedure for the channel of the shared radio frequency spectrum band. The transmitting wireless device may perform, prior to the data transmission to the second wireless device, the channel access procedure on the channel of the shared radio frequency spectrum band, wherein the channel access procedure comprises monitoring the channel using a beam configuration associated with the data transmission, the monitoring occurring for at least one or more consecutive instances of the identified threshold listen time.

Figure 2A:
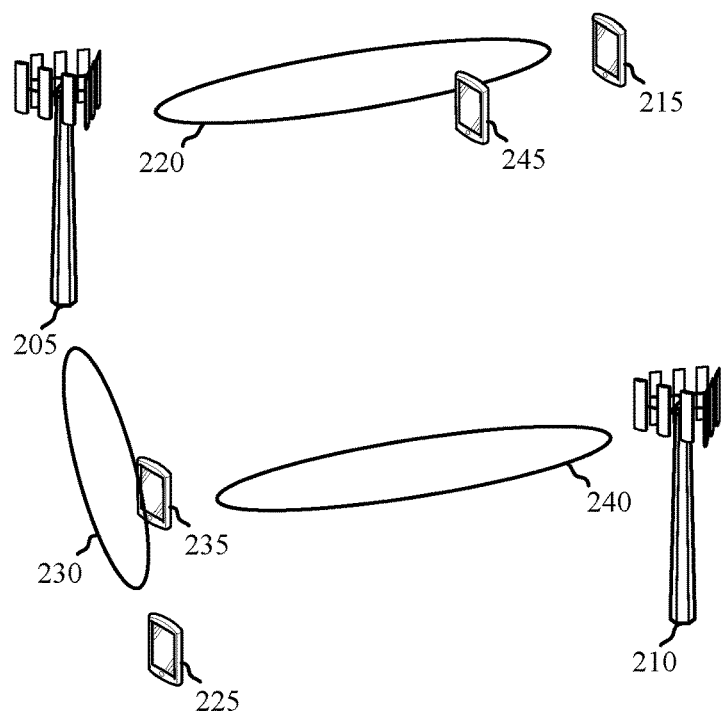
FIGS. 2A and 2B illustrate examples of a system for wireless communication that supports reservation repetition for deafness avoidance in accordance with aspects of the present disclosure.
Figure 2B:
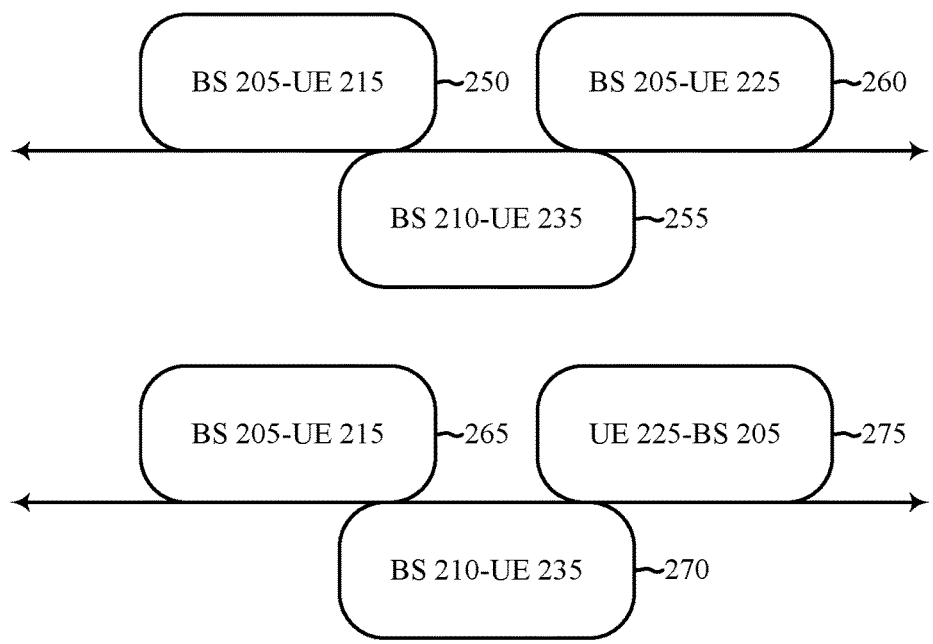

FIGS. 2A and 2B illustrates aspects of an example wireless communication system 200 that supports reservation repetition for deafness avoidance in accordance with various aspects of the present disclosure. In some examples, wireless communication system 200 may implement aspects of wireless communication system 100. Wireless communication system 200 may include base stations 205 and 210 and UEs 215, 225, 235, and 245. Wireless communication system 200 may be a mmW wireless communication system.

Generally, base station 205 may be associated with UEs 215 and 225 and base station 210 may be associated with UE 235. For example, base station 205 may communicate with UE 215 using beam configuration 220 and communicate with UE 225 using beam configuration 230. Base station 210 may communicate with UE 235 using beam configuration 340. Beam configurations 220, 230, and/or 240 may broadly refer to beamformed transmissions, wherein each beam configuration may include a transmit beam and/or a receive beam (e.g., a beam pair link). UE 245 may be associated with either of base stations 205 or 210. In some aspects, base stations 205 and 210 may be associated with different operators such that inter-base station communications (e.g., for communication scheduling) may be absent.

Despite (or because of) the directionality of transmissions/receptions in a mmW wireless communication system, interference may become a more complicated issue to manage. Traditionally, transmissions would span larger coverage areas (e.g., even intra-cell communications) such that channel capture would lead to unused resources out of concerns for interference. While this may be applicable in a mmW network, the issues of interference become more discrete in view of the directionality.

As one example, deafness may become more prevalent in a mmW wireless communication system than in a non-mmW wireless communication system. Broadly, deafness may refer to a neighboring device that does not "hear" a transmission from other devices, e.g., channel reservation transmissions, ongoing data communications, and the like. Generally, a device may be considered "deaf" when the device is tuned to a different beam direction at the time "t" (e.g., a time component) and/or the device is not listening (e.g., monitoring) the medium (e.g., a directional component) at the time t when a preamble was transmitted on the beam configuration attempting to contend for the channel at time t+k, e.g., channel reservation signaling for a future data transmission.

As one example and with reference to FIG. 2B, base station 205 may be communicating (e.g., transmitting, receiving, monitoring) with UE 215 using beam configuration 220 during period 250. UE 245 may be deaf (e.g., tuned to a different beam configuration) to channel reservation signaling exchanged between base station 205 and UE 215 and may therefore not be aware of the upcoming data communications. Accordingly, in that context UE 245 may be interfered with by beam configuration 220. UE 245 may begin communications with another device and interfere with the communications between base station 205 and UE 215. In some aspects, base station 205 may miss (or be "deaf" to) reservation signaling communicated between base station 210 and UE 235 during period 255. Therefore, base station 205 may not be aware of the upcoming data communications, which may also introduce interference during period 260.

As another example, base station 205 may communicate with UE 215 during period 265. UE 225 may be scheduled for uplink communications to base station 205 during period 275 and, due to power consumption considerations, may not monitor channel reservation signaling between base station 210 and UE 235 during period 270. In that scenario, the uplink transmissions from 225 may collide with downlink signal for UE 235.

To address such "deafness" issues, certain aspects of the described techniques provide for repetition of channel reservation signaling (or other signaling suitable to signal that the channel is scheduled) by a receiving wireless device. For example, a receiving wireless device (UE 215 as one example) may determine that data communications is schedule for the receiving wireless device. The data communications may be scheduled on a channel and during a TxOP that spans multiple slots. The receiving wireless device may identify a subset of the slots during the TxOP to use for repeated transmissions of signal reserving the channel (e.g., a channel reservation signal). The receiving wireless device may receive the data communications during the other slots of the TxOP using a beam configuration (e.g., beam configuration 220). The receiving wireless device may also transmit repeated instances of the channel reservation signal in the subset of slots using a beam configuration based on the beam configuration used for the data communications, e.g., on receiving device transmit beam that is selected based at least in part on a receive beam being used to receive the data communications. Accordingly, the repeated transmissions of the channel reservation signal may server as an advertisement to other devices that were deaf during the initial channel reservation exchange that the channel is occupied. In some aspects, the receiving wireless device may configure each instance of the repeated channel reservation signal transmission with an indication of how long the channel will be used, e.g., either an absolute end time or a relative end time from that transmission of the channel reservation message.

In some aspects, the receiving wireless device, whether a UE or base station, may transmit a repeated reservation response message (RRS) message every T symbols or slots, e.g., NR self-contained slots. For a downlink scenario, the base station (e.g., base station 205) may configure a gap for the UE (e.g., UE 215) to transmit the RRSs or the UE may puncture one of the received symbols or slots to transmit RRS every "X" slots. X may be RRC configured or indicated by the base station in the downlink grant. If a multi-subframe (MSF) grant is used for the downlink, then particular subframes where the RRS gaps are provisioned may be indicated in the MSF grant. In an uplink scenario, the base station may indicate to the UE to leave gaps for base station's RRS transmissions every X slots. If puncturing is used (as opposed to a provisioned RRS gaps), the receiving wireless device may transmit repeated instances of the RRSs based on the outcome of semi-static on demand listen-before-talk (OD-LBT) procedure where it could be a victim to another node's transmission.

In some aspects, a modified NR frame structure may be used to provision for the RRS transmission gaps. The guard symbol(s) in the NR frame structure may be used for the purpose of RRS repeated transmissions. The receiving wireless device may transmit RRS repetition in a multiplexed fashion with uplink control information, downlink control signaling, and the like. Such multiplexing may be performed in the frequency domain and/or time domain. Each RRS instance may contain a medium reservation time for that particular beam direction. The RRS may contain the absolute time to expiration of the medium reservation (same message can be repeated every instance) or the relative time of expiration of medium reservation. RRS repetition may be optional and left to the receiving wireless device e.g., a node that identifies itself as a potential victim (through OD-LBT for example, or if it were receiving a large rank transmission) may indicate to the UE semi-statically to configure RRS transmission gaps under such conditions. This may minimize overhead costs. RRS repetition message may also contain a tolerable interference strength and/or tolerable interference rank.

Figure 3:
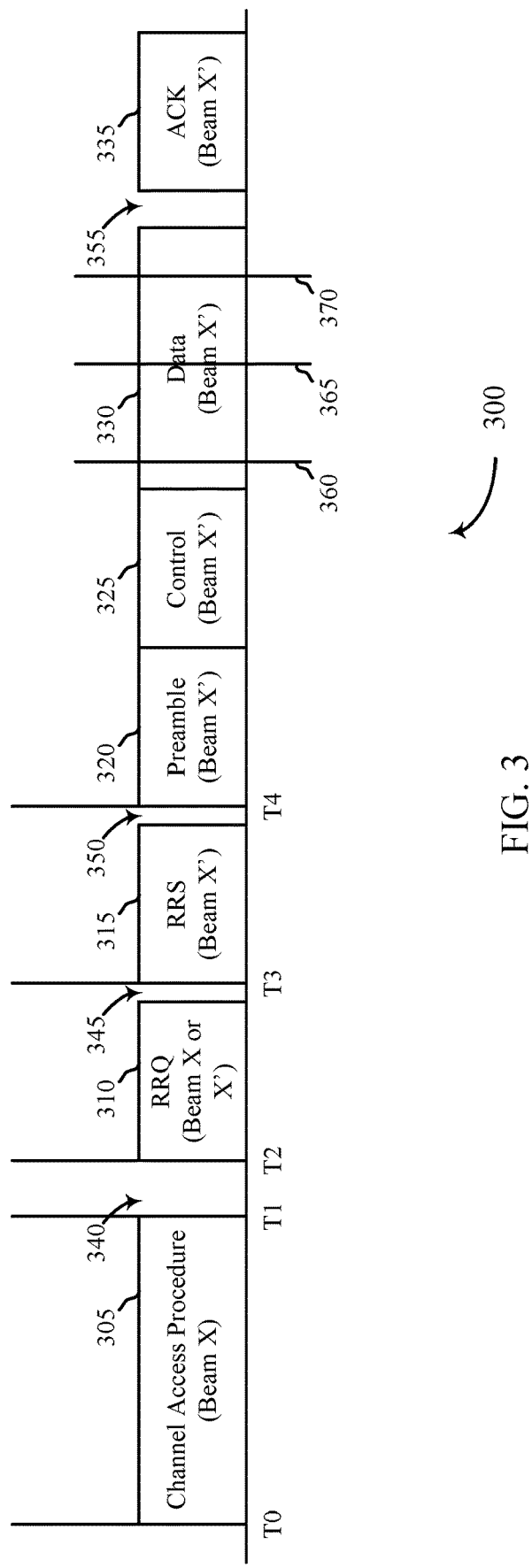
FIG. 3 illustrates an example of a timing diagram that supports reservation repetition for deafness avoidance in accordance with aspects of the present disclosure.

FIG. 3 illustrates an example of a timing diagram 300 that supports reservation repetition for deafness avoidance in accordance with various aspects of the present disclosure. In some examples, timing diagram 300 may implement aspects of wireless communication systems 100/200. Aspects of timing diagram 300 may be implemented by a UE or a base station, which may be examples of the corresponding devices described herein. Generally, timing diagram 300 illustrates one example technique for RRS repetition for deafness avoidance.

Timing diagram 300 may include a channel access procedure 305 that occurs during a period occurring between time T0 and time T1. At time T0 a transmitting device (e.g., a base station) may receive a packet for transmission to a receiving wireless device (e.g., a UE) and begin performing the channel access procedure 305 on a channel of a shared radio frequency spectrum band in response. The base station may use a first beam configuration for the channel access procedure 305. In some aspects, the base station may select the first beam configuration, which may be beam X in some examples.

The channel access procedure 305 may be an energy detection LBT procedure, a preamble based LBT procedure, and the like. For example, the base station may select thresholds for energy detection and/or preamble detection to use during the channel access procedure 305. In some aspects, the channel access procedure 205 may include energy detection over N contention slots (countdown from N to 0). In some aspects, the channel access procedure 305 may include the base station monitoring for RRS or RRQ over M slots.

The channel access procedure 305 may be considered successful if the channel is determined available for communicating the downlink data and unsuccessful if the base station detects an energy level/preamble above the threshold and/or other RRQ/RRS exchanges on the channel during the channel access procedure. In some aspects, the channel access procedure may be considered successful when there are no active RRQ or RRS exchanges detected during the channel access procedure. An active RRQ or RRS exchange may include the base station detecting a corresponding preamble message in conjunction with the RRQ or RRS.

If the channel access procedure 305 is successful and at time T2, the base station may transmit an RRQ 310 to the UE. Generally, the RRQ 310 may include a reservation request for a particular direction. In this context, direction may refer to a transmit-receive beam pair, with uplink and downlink representing different directions. The RRQ 310 may be transmitted using a second beam configuration that uses the same beam width as the first beam configuration (e.g., beam X) or a narrower beam configuration (e.g., beam X').

At time T3 and in response to the RRQ 310, the base station may receive an RRS 315 from the UE. The RRS 315 may be for a particular direction. The RRS 315 may have a third beam configuration that is based at least in part on the second beam configuration. The RRS 315 may be received on a beam pair link (BPL) that is based on the second beam configuration, e.g., the UE may transmit the RRS 315 using a beam configuration that is selected based on the second beam configuration (e.g., beam X').

At time T4, the base station may transmit a preamble 320 in response to the RRS 315 using the second beam configuration. The preamble 320 may be configured to confirm a reservation for the channel in the particular direction. The base station may then transmit a control signal 325 indicating one or more resources to be used for data communications 330 with the UE. The allocated resource may include an indication of the TxOP spanning multiple slots. The base station may transmit the data communication 330 using the one or more resources and during the TxOP. Generally, the UE may respond with an acknowledgement 335 acknowledging (ACK) or negative acknowledging (NACK) successful receipt of the data communications 330.

In some aspects, the timing diagram 300 may also include a deferment period 340, a first inter-frame spacing (IFS) 345, and a second IFS 350. Generally, the base station may make scheduling decisions (e.g., with regards to the particular channel access procedure 305, whether to or how to configure the RRQ 310 transmission, and/or whether to and how to configure the preamble 320 transmission) at each of the deferment period 340, the first IFS 345, and the second IFS 355, respectively. The third IFS 355 may be used by the receiving device to retune from downlink to uplink communications, or vice versa.

While this procedure may be acceptable to the transmitting and receiving wireless devices, other wireless devices may be deaf to the initial channel reservation signaling (e.g., RRQ 310, RRS 315, and/or preamble 320. Accordingly and to address such deafness concerns, the receiving wireless device (e.g., the UE) may be configured for repeated transmission of a signal reserving the channel during the TxOP being used for the data communications 330.

For example, the UE may determine that a data communication 330 is scheduled for the UE on the channel during the TxOP spanning multiple slots, e.g., based on the RRQ 310, the RRS 315, and/or the preamble 320. The UE may identify a subset of the slots of the TxOP to be (or that can be) used for repeated transmissions of the channel reservation signal. For example, UE may identify the subset of slots based on the control signal 325 which grants the resources for the data communications 330, e.g., the slots spanning the TxOp, the MCS to be used, the rank, etc. The UE may receive the data communications 330 during the TxOP using the beam configuration and also perform repeated transmissions of the channel reservation signal based on the beam configuration. For example, the UE may transmit the channel reservation signal at 360, at 365, and again at 370. Accordingly, other wireless devices that may be interfered by, or cause interference to the data communiations 330 may receive any of the repeated transmissions of the channel reservation signal from the UE and become aware of the channel usage.

It is to be understood that references to a channel reservation signal may include any signal that carries or otherwise conveys an indication that the channel is occupied for the data communications 330. For example, the channel reservation signal may include a repeated transmission of the RRS 315 or other suitable signal that conveys such an indication.

Figure 4:
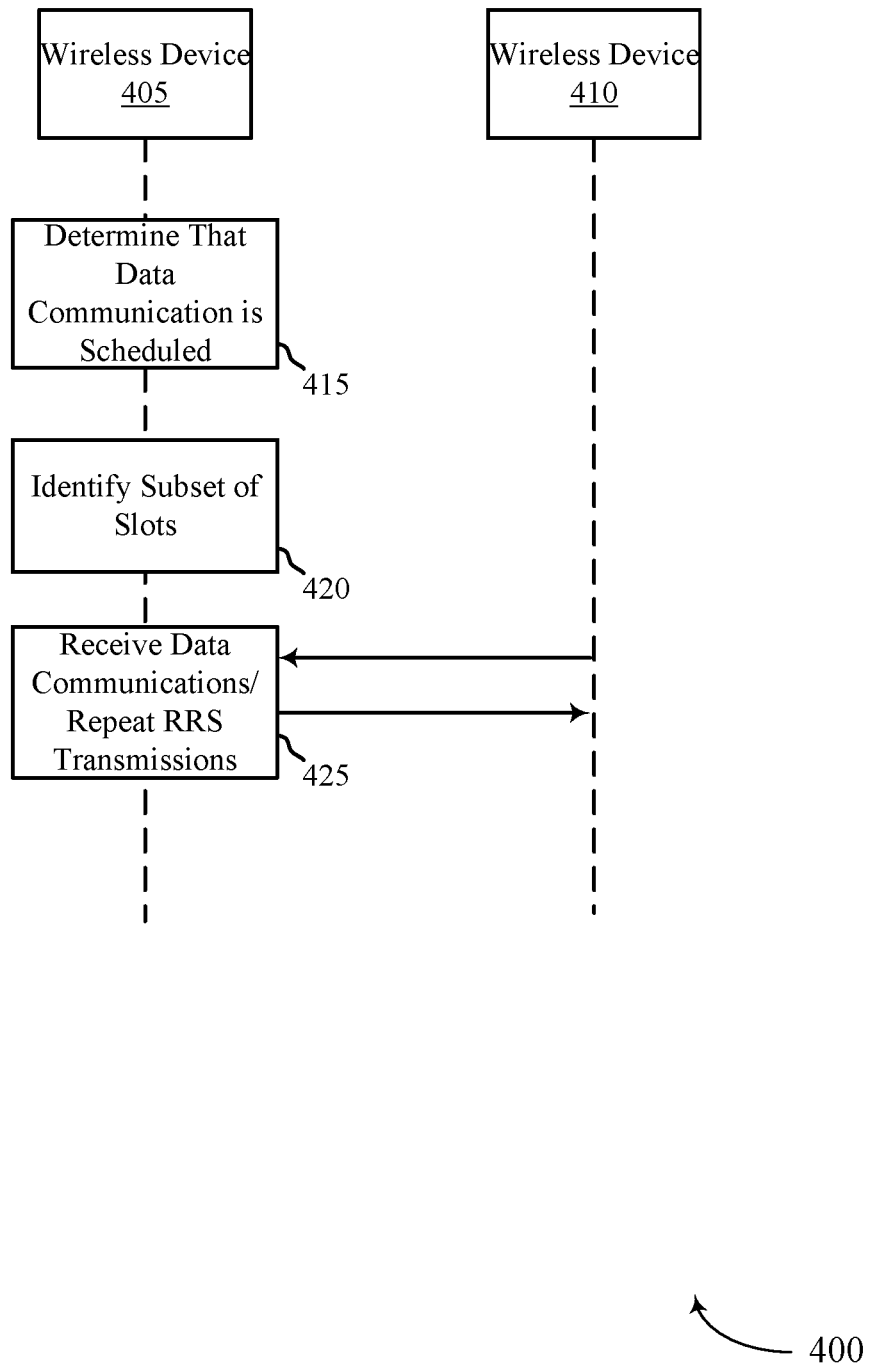
FIG. 4 illustrates an example of a process that supports reservation repetition for deafness avoidance in accordance with aspects of the present disclosure.

FIG. 4 illustrates an example of a process 400 that supports reservation repetition for deafness avoidance in accordance with various aspects of the present disclosure. In some examples, process 400 may implement aspects of wireless communication systems 100/200 and/or timing diagram 300. Process 400 may include a wireless device 405 and a wireless device 410, which may be examples of the corresponding base station and/or UE described herein. Generally, wireless device 405 may be considered a receiving wireless device and wireless device 410 may be considered a transmitting wireless device.

At 415, wireless device 405 may determine that a data communication is scheduled for the wireless device 405. The data communications may be scheduled during a TxOP that spans multiple slots. The data communications may be scheduled on a channel of a shared radio frequency spectrum band. For example, wireless device 405 may determine that the data communications are scheduled using aspects of timing diagram 300.

At 420, wireless device 405 may identify subset of slots from the multiple slots of the TxOP. The subset of slots may be identified to be used for transmissions of a channel reservation signal. The subset of slots may be identified based on the channel reservation signaling received from the transmitting device and/or may be identified autonomously by the wireless device 405.

In some aspects, wireless device 405 may receive an indication of a plurality of gap periods within the TxOP and identify the subset of slots based at least in part on the indication. The indication may be received in at least one of: a control signal received from a base station, or in an RRC signal received from the base station, or in a multi-subframe downlink grant received from the base station, and the like.

In some aspects, wireless device 405 may receive a request for a plurality of gap periods configured within the TxOP and identify the subset of slots based at least in part on the request. The request may be received in at least one of: a control signal received from a base station, or in an RRC signal received from the base station, or in a multi-subframe uplink grant received from the base station, and the like. The request may be received based at least in part on an LBT procedure performed on the channel, a transmission rank associated with the data communication, or a combination thereof. For example, the request may be received from a potential victim node.

In some aspects, wireless device 405 may identify an NR frame structure associated with the data communications and identify the subset of slots based at least in part on the NR frame structure.

At 425, wireless device 405 may receive the data communications during the TxOP and, in the identified subset of slots perform retransmissions of a channel reservation signal based on the beam configuration. For example, wireless device 405 may repeat the transmissions of the channel reservation signal using a beam configuration selected based on a beam configuration being used to receive the data communications.

In some aspects, wireless device 405 may puncture the subset of slots with the repeated transmissions of the channel reservation signals. Wireless device 405 may perform an OD-LBT procedure on the channel prior to puncturing the subset of slots.

In some aspects, wireless device 405 may multiplex in a time domain and/or a frequency domain one or more transmissions of UCI with the repeated transmissions of the channel reservation signal. In some aspects, wireless device 405 may multiplex in a time domain and/or a frequency domain one or more transmissions of downlink control signaling with the repeated transmissions of the channel reservation signal. The downlink control signaling may include a PDCCH grant, or an override of a previous PDCCH grant, or a new or updated MCS, or a new or updated rank indicator, or a new or updated TxOP length, or a new or updated frame format indicator, and/or a new or updated resource allocation.

In some aspects, wireless device 405 may configure each instance of the channel reservation signal with an end time period associated with the data communication. The end time period may include an absolute time identifying the end of the data communication or a relative time period based at least in part on a timing of the transmission of the channel reservation signal with respect to the end of the data communication. In some aspects, wireless device 405 may configure each instance of the channel reservation signal with an acceptable interference level indication and/or an acceptable interference rank indication.

In some aspects, the beam configuration for the repeated transmissions of the channel reservation signal may be the same beam configuration or a different beam configuration as is used for the data communication.

Figure 5:
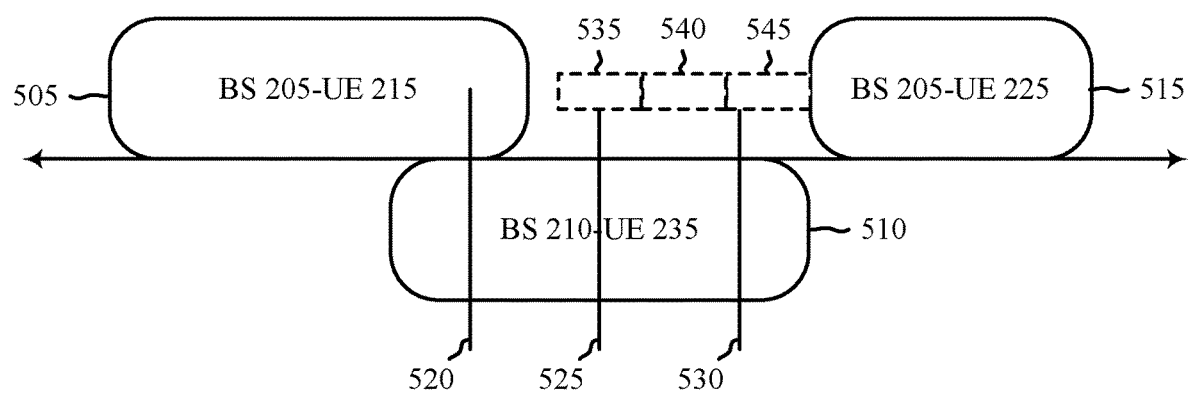
FIG. 5 illustrates an example of a timing diagram that supports reservation repetition for deafness avoidance in accordance with aspects of the present disclosure.

FIG. 5 illustrates an example of a timing diagram 500 that supports reservation repetition for deafness avoidance in accordance with various aspects of the present disclosure. In some examples, timing diagram 500 may implement aspects of wireless communication systems 100/200, timing diagram 300 and/or process 400. Aspects of timing diagram 500 may be implemented by a UE or a base station, which may be examples of the corresponding devices described herein. Generally, timing diagram 500 illustrates one example technique for a minimum listen time for deafness avoidance. Aspects of timing diagram 500 may be described with respect to the devices of wireless communication system 200.

Timing diagram 500 may include a first period 505 where base station 205 performs data communications with UE 215 using a first beam configuration (e.g., beam configuration 220), a second period 510 where base station 210 performs data communications with UE 235 using a second beam configuration (e.g., beam configuration 240), and a third period 515 where base station 205 performs data communications with UE 225 using a third beam configuration (e.g., beam configuration 230). Generally, each of the periods 505, 510, and 515 may implement aspects of timing diagram 300, e.g., may include various channel reservation signaling such as RRQ, RRS, preamble, etc. However, aspects of timing diagram 500 may include a contending node to be able to monitor for repeated transmissions of a channel reservation signaling at the beginning of the TxOP (e.g., the corresponding period).

Aspects of timing diagram 500 may include a receiving wireless device (e.g., base station 210 or UE 235) to perform repeated transmissions of a channel reservation signal, as is generally described with reference to FIGS. 2-4. Thus, the receiving wireless device may transmit an instance of the channel reservation signal at 520, at 525, and again at 530. The repeated transmissions of the channel reservation signal may provide an opportunity for other device, e.g., other than the transmitting and receiving devices, to detect the channel usage to avoid interference.

Thus, a transmitting wireless device (such as base station 205 with data available to communicate to UE 225) may listen (e.g., monitor) on a beam configuration for a minimum time duration (e.g., threshold listen time) consecutively before considering the channel available for the data communications. The channel between the transmitting device (e.g., base station 205) and the receiving wireless device (e.g., UE 225) may not be established until the full duration of the minimum listen time (or higher) is consecutively determined to be clear.

Thus, the transmitting wireless device (e.g., base station 205) may determine that a data transmission to a second wireless device (e.g., receiving wireless device/UE 225) is scheduled on the channel. For example, data may arrive at the transmitting wireless device that is destined for the receiving wireless device. The transmitting wireless device may identify a threshold time limit associated with a channel access procedure (e.g., the channel access procedure 305) for the channel. For example, the transmitting device may identify the minimum listen time based on an OD-LBT procedure enabled for the channel, the beam configuration used for the channel access procedure, and the like. In some aspects, different threshold listen times may be established when the transmitting wireless device is a base station or a UE.

The transmitting wireless device may perform the channel access procedure on the channel to monitor the channel using a beam configuration associated with the data transmission, e.g., beam X. The channel access procedure may include monitoring the channel for one or more consecutive instances of the threshold listen time. For example, the transmitting device may monitor the channel for threshold listen times 535, 540, and 545 during the channel access procedure. The transmitting wireless device may monitor the channel using an energy detection LBT procedure, a reservation signaling LBT procedure, and the like. Once the satisfactory number of threshold listen times are monitored and determined to be clear, the transmitting device may determine that the channel is clear and continue with the channel reservation signaling to support the data communications.

In some aspects, the channel access procedure may include one instance of the threshold listen time, e.g., when monitoring for a channel reservation signal that carries or otherwise conveys and end time associated with the data communications. In other aspects, the channel access procedure may include monitoring the channel for two, three, or some other number of instances of the threshold listen time without detecting energy levels above a threshold on the channel.

In some aspects, the described techniques may be a mandatory requirement on the contending node or may be optional and therefore incurring a deafness/overhead tradeoff along with it. In some aspects, the minimum (threshold) listen time on a new beam direction may be mandated only on directions enabled by OD-LBT. The length of minimum listen time may be requested by potential victim nodes during on-demand LBT process. In some aspects, the minimum listen time for a UE and the minimum listen time for a base station may be different (e.g., to accommodate for grant delays). In some aspects, the minimum listen time for each beam direction may be advertised by the potential aggressor nodes during an OD-LBT procedure, allowing the victim nodes to configure RRS repetition period accordingly. In some aspects, for cases involving countdown over 'N' slots, a composite criteria of N slots of medium clearance may be used along with the minimum listen time.

Figure 6:
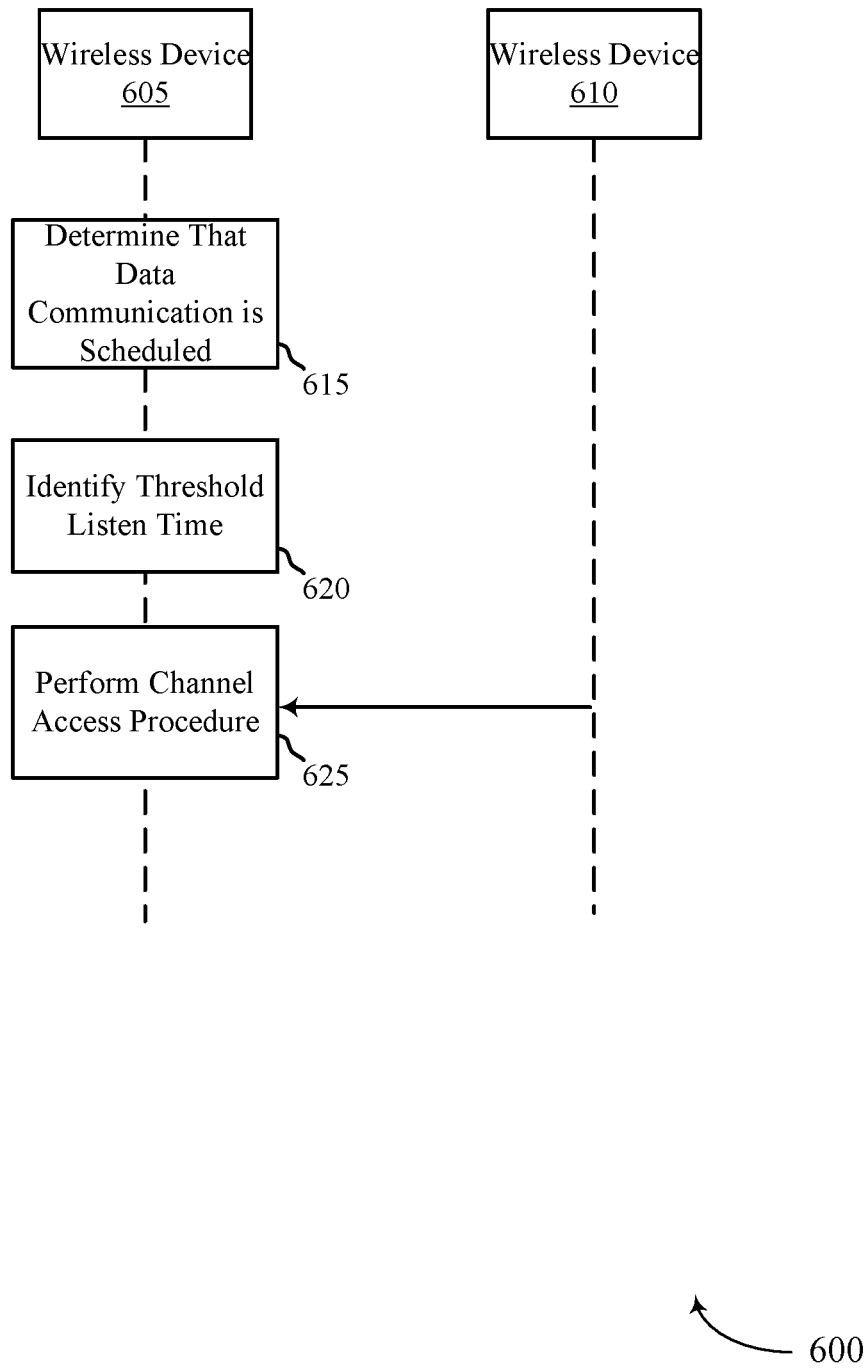
FIG. 6 illustrates an example of a process that supports reservation repetition for deafness avoidance in accordance with aspects of the present disclosure.

FIG. 6 illustrates an example of a process 600 that supports reservation repetition for deafness avoidance in accordance with various aspects of the present disclosure. In some examples, process 600 may implement aspects of wireless communication systems 100/200, timing diagrams 300/500, and/or process 400. Process 600 may include a wireless device 605 and a wireless device 610, which may be examples of the corresponding base station and/or UE described herein. Generally, wireless device 605 may be considered a transmitting wireless device and wireless device 610 may be considered a receiving wireless device.

At 615, wireless device 605 may determine that a data transmission to wireless device 610 is schedule on a channel. For example, wireless device 605 may receive data in a buffer that is destined for wireless device 610.

At 620, wireless device 605 may identify a threshold listen time for a channel access procedure on the channel. For example, wireless device 605 may identify the threshold listen time based on an OD-LBT procedure that is enabled for the channel.

In some aspects, wireless device 605 may determine that an OD-LBT procedure is enabled on the channel and identify the threshold listen time based at least in part on the OD-LBT procedure being enabled. In some aspects, wireless device 605 may determine that a new beam configuration is being used for the channel access procedure and identify the threshold listen time based at least in part on the new beam configuration. In some aspects, wireless device 605 may receive an indication from a third wireless device that an OD-LBT procedure is enabled on the channel and identify the threshold listen time based at least in part on the OD-LBT procedure being enabled. In some aspects, the indication from the third wireless device is received during the OD-LBT procedure of the third wireless device and indicates the threshold listen time.

At 625, wireless device 605 may perform, e.g., before the data communication, a channel access procedure on the channel. During the channel access procedure, wireless device 605 may monitor the channel for one or more instances of the threshold listen time. Wireless device 605 may monitor the channel for a channel reservation signal (e.g., RRS) received over a plurality of slots, for an energy level detected over a threshold level for a plurality of slots, and the like. In some aspects, monitoring the channel may include monitoring the channel for a channel reservation signal or monitoring the channel for a threshold amount of energy.

Figure 7:
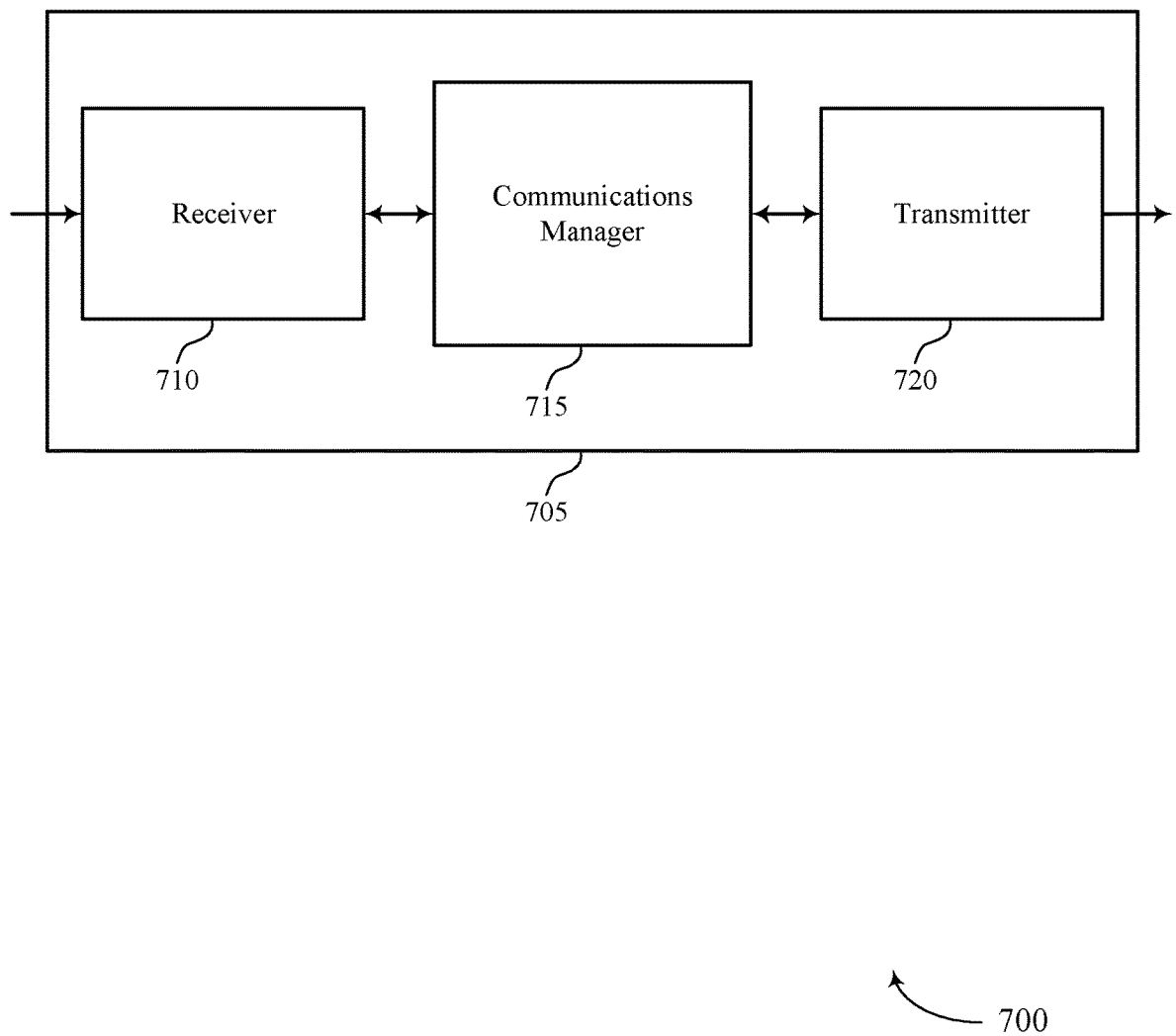
FIGS. 7 through 9 show block diagrams of a device that supports reservation repetition for deafness avoidance in accordance with aspects of the present disclosure.

FIG. 7 shows a block diagram 700 of a wireless device 705 that supports reservation repetition for deafness avoidance in accordance with aspects of the present disclosure. Wireless device 705 may be an example of aspects of a UE 115 or base station 105 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to reservation repetition for deafness avoidance, etc.). Information may be passed on to other components of the device. The receiver 710 may be an example of aspects of the transceiver 1035 described with reference to FIG. 10. The receiver 710 may utilize a single antenna or a set of antennas.

Communications manager 715 may be an example of aspects of the communications manager 1015 described with reference to FIG. 10.

Communications manager 715 and/or at least some of its various sub-components may be implemented in hardware, software executed by a processor, firmware, or any combination thereof If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may determine that a data communication is scheduled for the wireless device on a channel of a shared radio frequency spectrum band during a TxOP spanning a set of slots, identify a subset of slots from the set of slots, where the subset of slots is associated with a channel reservation signal by the wireless device, receive the data communication at the wireless device during the TxOP using a beam configuration, and perform, by the wireless device, repeated transmissions of the channel reservation signal based on the beam configuration during the subset of slots and within a time period associated with receiving the data communication. The communications manager 715 may also determine that a data transmission to a second wireless device is scheduled on a channel of a shared radio frequency spectrum band, identify a threshold listen time associated with a channel access procedure for the channel of the shared radio frequency spectrum band, and perform, prior to the data transmission to the second wireless device, the channel access procedure on the channel of the shared radio frequency spectrum band, where the channel access procedure includes monitoring the channel using a beam configuration associated with the data transmission, the monitoring occurring for at least one or more consecutive instances of the identified threshold listen time.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
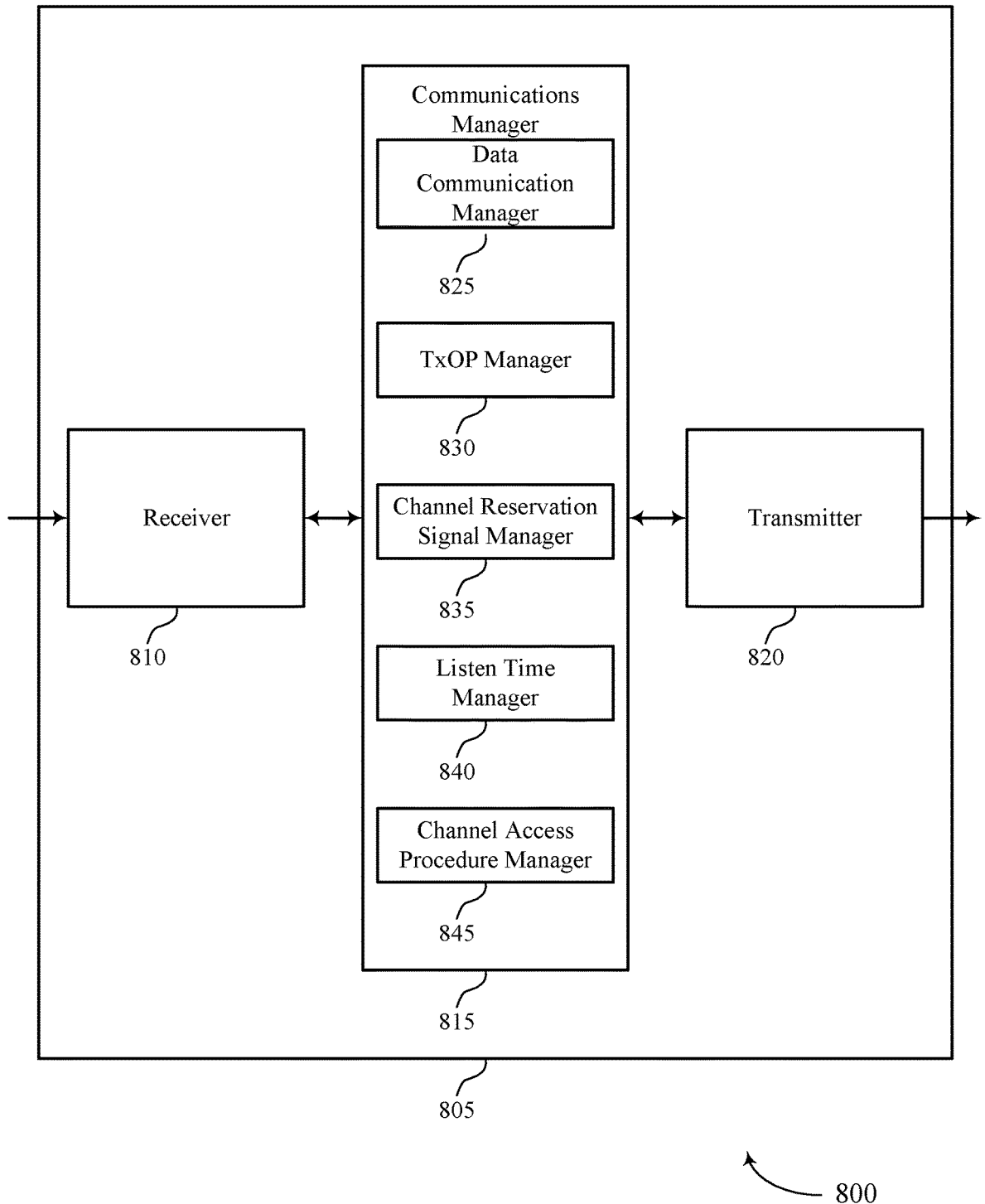

FIG. 8 shows a block diagram 800 of a wireless device 805 that supports reservation repetition for deafness avoidance in accordance with aspects of the present disclosure. Wireless device 805 may be an example of aspects of a wireless device 705 or a UE 115 or base station 105 as described with reference to FIG. 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to reservation repetition for deafness avoidance, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10.

Communications manager 815 may also include data communication manager 825, TxOP manager 830, channel reservation signal manager 835, listen time manager 840, and channel access procedure manager 845.

Data communication manager 825 may determine that a data communication is scheduled for the wireless device on a channel of a shared radio frequency spectrum band during a TxOP spanning a set of slots, receive the data communication at the wireless device during the TxOP using a beam configuration, and determine that a data transmission to a second wireless device is scheduled on a channel of a shared radio frequency spectrum band.

TxOP manager 830 may identify a subset of slots from the set of slots, where the subset of slots is associated with a channel reservation signal by the wireless device.

Channel reservation signal manager 835 may perform, by the wireless device, repeated transmissions of the channel reservation signal based on the beam configuration during the subset of slots and within a time period associated with receiving the data communication, configure each instance of the channel reservation signal with an end time period associated with the data communication, where the end time period includes at least one of: an absolute time identifying the end of the data communication or a relative time period based on a timing of the transmission of the channel reservation signal with respect to the end of the data communication, and configure each instance of the channel reservation signal with at least one of: an acceptable interference level indication, an acceptable interference rank indication, or a combination thereof. In some cases, the beam configuration for the repeated transmissions of the channel reservation signal includes the same beam configuration used for the data communication. In some cases, the beam configuration for the repeated transmissions of the channel reservation signal includes a different beam configuration used for the data communication.

Listen time manager 840 may identify a threshold listen time associated with a channel access procedure for the channel of the shared radio frequency spectrum band and monitor the channel for a channel reservation signal over a set of slots. In some cases, a first threshold listen time is identified when the first wireless device includes a base station and a second threshold listen time is identified when the first wireless device includes a UE.

Channel access procedure manager 845 may perform, prior to the data transmission to the second wireless device, the channel access procedure on the channel of the shared radio frequency spectrum band, where the channel access procedure includes monitoring the channel using a beam configuration associated with the data transmission, the monitoring occurring for at least one or more consecutive instances of the identified threshold listen time, determine that a new beam configuration is being used for the channel access procedure, where the threshold listen time is identified based on the new beam configuration, and where monitoring the channel includes at least one of: monitoring the channel for a channel reservation signal or monitoring the channel for a threshold amount of energy.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
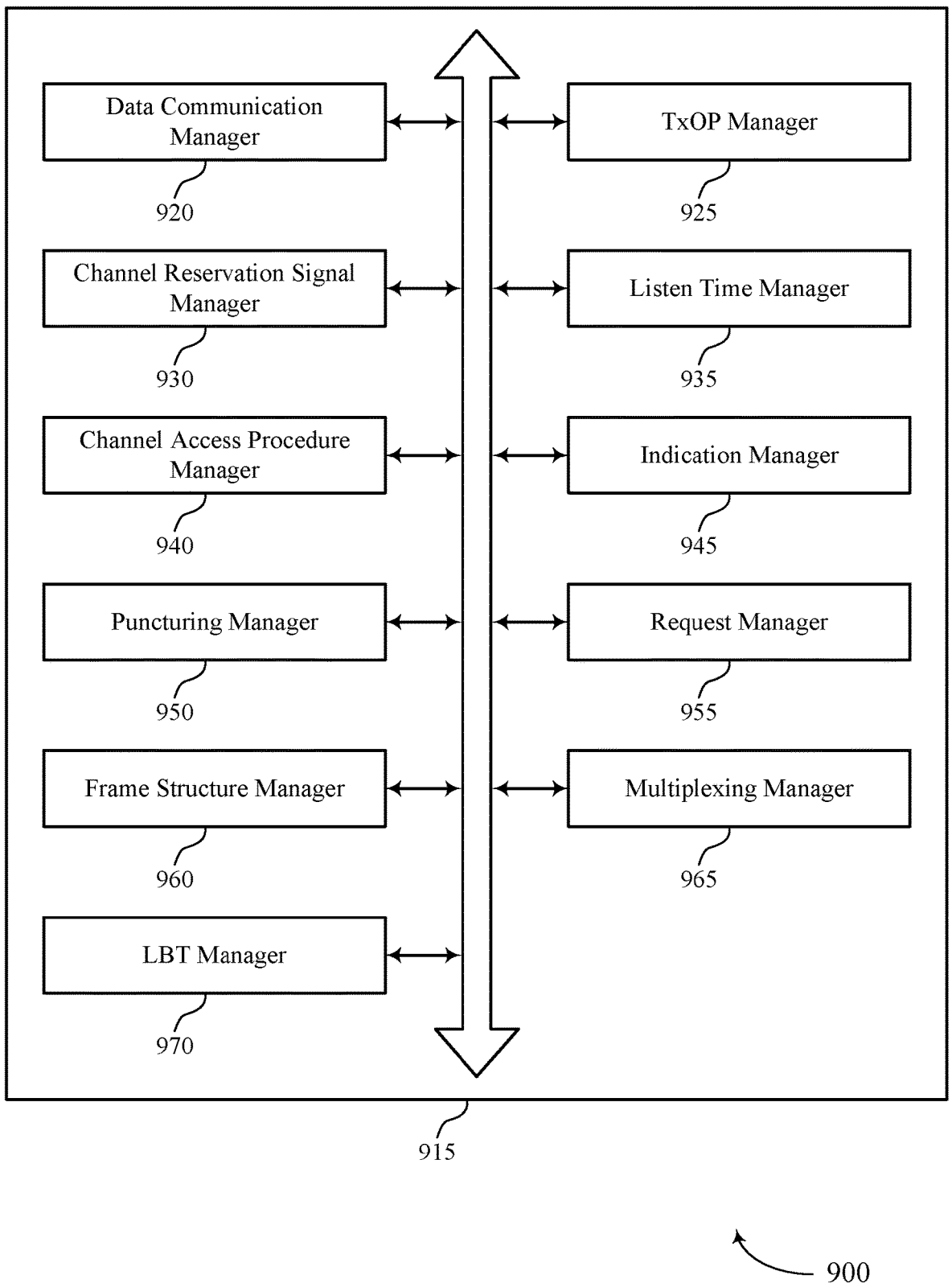

FIG. 9 shows a block diagram 900 of a communications manager 915 that supports reservation repetition for deafness avoidance in accordance with aspects of the present disclosure. The communications manager 915 may be an example of aspects of a communications manager 715, a communications manager 815, or a communications manager 1015 described with reference to FIGS. 7, 8, and 10. The communications manager 915 may include data communication manager 920, TxOP manager 925, channel reservation signal manager 930, listen time manager 935, channel access procedure manager 940, indication manager 945, puncturing manager 950, request manager 955, frame structure manager 960, multiplexing manager 965, and LBT manager 970. Each of these modules may communicate, directly or indirectly, with one another (e.g., via one or more buses).

Data communication manager 920 may determine that a data communication is scheduled for the wireless device on a channel of a shared radio frequency spectrum band during a TxOP spanning a set of slots, receive the data communication at the wireless device during the TxOP using a beam configuration, and determine that a data transmission to a second wireless device is scheduled on a channel of a shared radio frequency spectrum band.

TxOP manager 925 may identify a subset of slots from the set of slots, where the subset of slots is associated with a channel reservation signal by the wireless device.

Channel reservation signal manager 930 may perform, by the wireless device, repeated transmissions of the channel reservation signal based on the beam configuration during the subset of slots and within a time period associated with receiving the data communication, configure each instance of the channel reservation signal with an end time period associated with the data communication, where the end time period includes at least one of: an absolute time identifying the end of the data communication or a relative time period based on a timing of the transmission of the channel reservation signal with respect to the end of the data communication, and configure each instance of the channel reservation signal with at least one of: an acceptable interference level indication, an acceptable interference rank indication, or a combination thereof. In some cases, the beam configuration for the repeated transmissions of the channel reservation signal includes the same beam configuration used for the data communication. In some cases, the beam configuration for the repeated transmissions of the channel reservation signal includes a different beam configuration used for the data communication.

Listen time manager 935 may identify a threshold listen time associated with a channel access procedure for the channel of the shared radio frequency spectrum band and monitor the channel for a channel reservation signal over a set of slots. In some cases, a first threshold listen time is identified when the first wireless device includes a base station and a second threshold listen time is identified when the first wireless device includes a UE.

Channel access procedure manager 940 may perform, prior to the data transmission to the second wireless device, the channel access procedure on the channel of the shared radio frequency spectrum band, where the channel access procedure includes monitoring the channel using a beam configuration associated with the data transmission, the monitoring occurring for at least one or more consecutive instances of the identified threshold listen time, determine that a new beam configuration is being used for the channel access procedure, where the threshold listen time is identified based on the new beam configuration, and where monitoring the channel includes at least one of: monitoring the channel for a channel reservation signal or monitoring the channel for a threshold amount of energy.

Indication manager 945 may receive an indication of a set of gap periods within the TxOP, where the subset of slots are identified based on the indication and receive an indication from a third wireless device that an OD-LBT procedure is enabled on the channel, where the threshold listen time is identified based on the OD-LBT procedure being enabled. In some cases, the indication is received in at least one of: a control signal received from a base station, or in an RRC signal received from the base station, or in a multi-subframe downlink grant received from the base station. In some cases, the indication during the OD-LBT procedure of the third wireless device, where the indication identifies the threshold listen time.

Puncturing manager 950 may puncture the subset of slots with the repeated transmissions of the channel reservation signals and perform an OD-LBT procedure on the channel prior to puncturing the subset of slots.

Request manager 955 may receive a request for a set of gap periods configured within the TxOP, where the subset of slots are identified based on the request. In some cases, the request is received in at least one of: a control signal received from a base station, or in an RRC signal received from the base station, or in a multi-subframe uplink grant received from the base station. In some cases, the request is received based on at least one of: an LBT procedure performed on the channel, a transmission rank associated with the data communication, or a combination thereof.

Frame structure manager 960 may identify an NR frame structure associated with the data communications, where the subset of slots are identified based on the NR frame structure.

Multiplexing manager 965 may multiplex in at least one of: a time domain, a frequency domain, or a combination thereof, one or more transmissions of UCI with the repeated transmissions of the channel reservation signal and multiplex in at least one of: a time domain, a frequency domain, or a combination thereof, one or more transmissions of downlink control signaling with the repeated transmissions of the channel reservation signal. In some cases, the downlink control signaling includes at least one of: a PDCCH grant, or an override of a previous PDCCH grant, or a new or updated MCS, or a new or updated rank indicator, or a new or updated TxOP length, or a new or updated frame format indicator, or a new or updated resource allocation, or combinations thereof.

LBT manager 970 may determine that an OD-LBT procedure is enabled on the channel, where the threshold listen time is identified based on the OD-LBT procedure being enabled.

Figure 10:
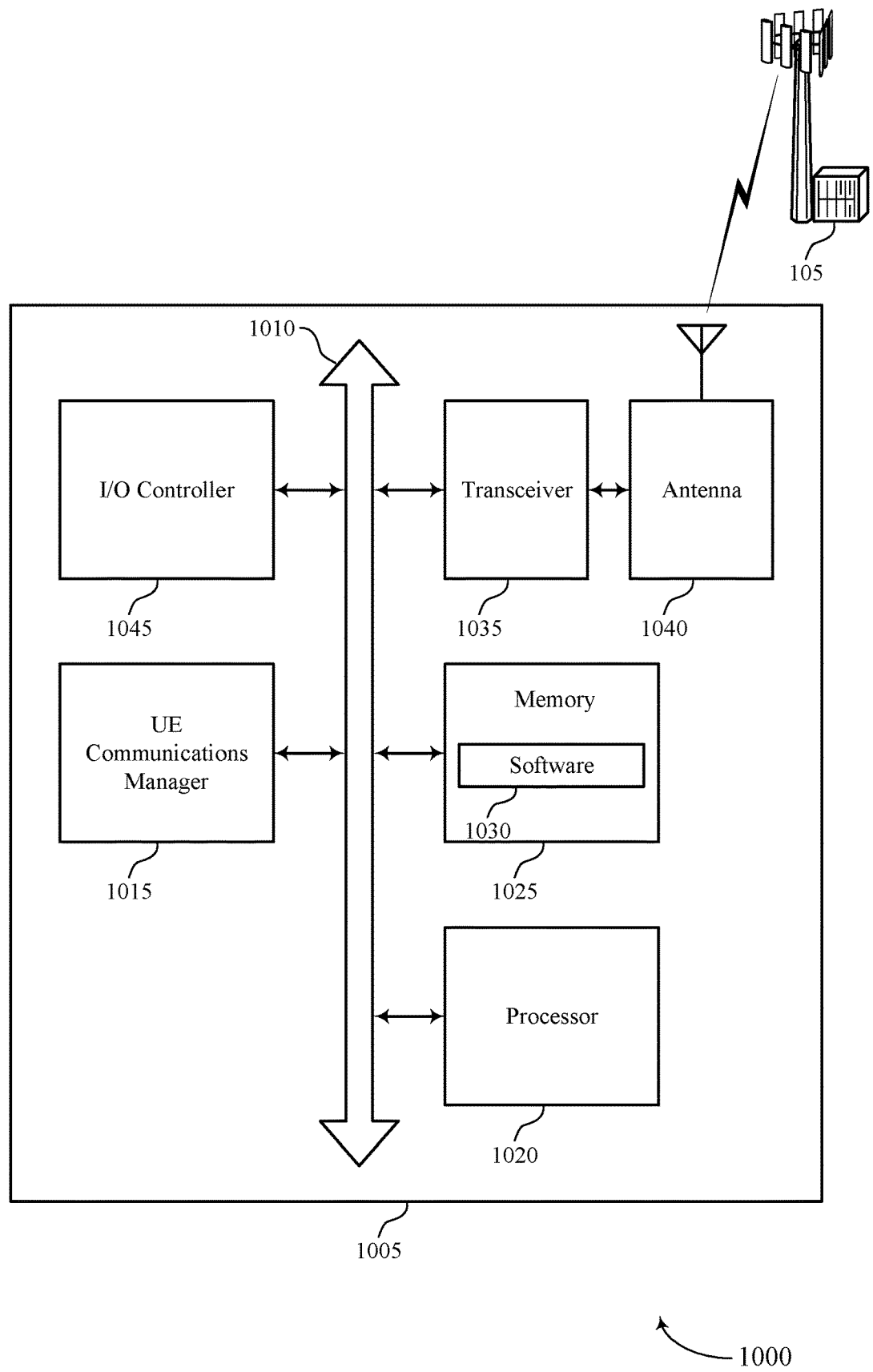
FIG. 10 illustrates a block diagram of a system including a UE that supports reservation repetition for deafness avoidance in accordance with aspects of the present disclosure.

FIG. 10 shows a diagram of a system 1000 including a device 1005 that supports reservation repetition for deafness avoidance in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting reservation repetition for deafness avoidance).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support reservation repetition for deafness avoidance. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
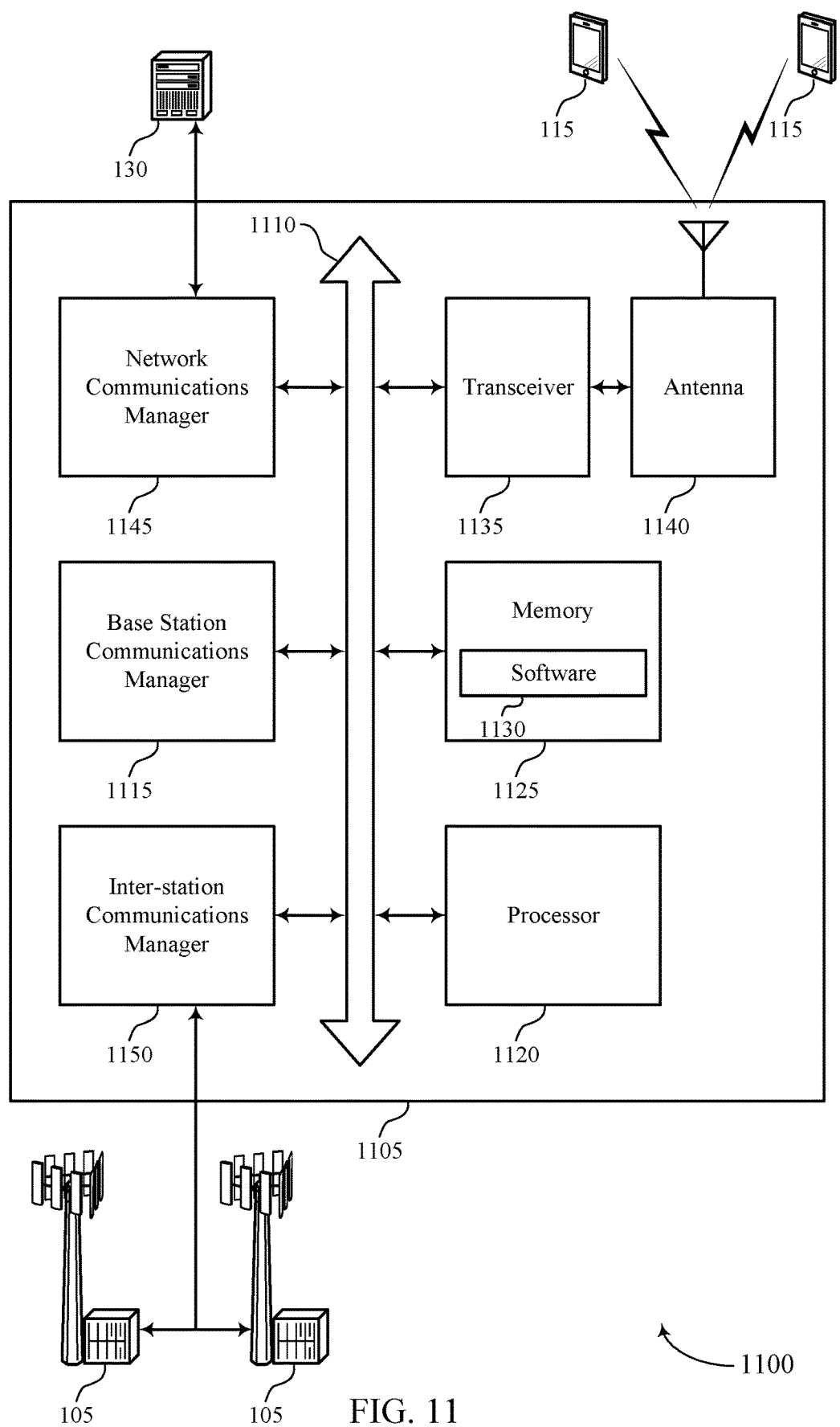
FIG. 11 illustrates a block diagram of a system including a base station that supports reservation repetition for deafness avoidance in accordance with aspects of the present disclosure.

FIG. 11 shows a diagram of a system 1100 including a device 1105 that supports reservation repetition for deafness avoidance in accordance with aspects of the present disclosure. Device 1105 may be an example of or include the components of wireless device 805, wireless device 905, or a base station 105 as described above, e.g., with reference to FIGS. 8 and 9. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting reservation repetition for deafness avoidance).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support reservation repetition for deafness avoidance. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an LTE/LTE-A wireless communication network technology to provide communication between base stations 105.

Figure 12:
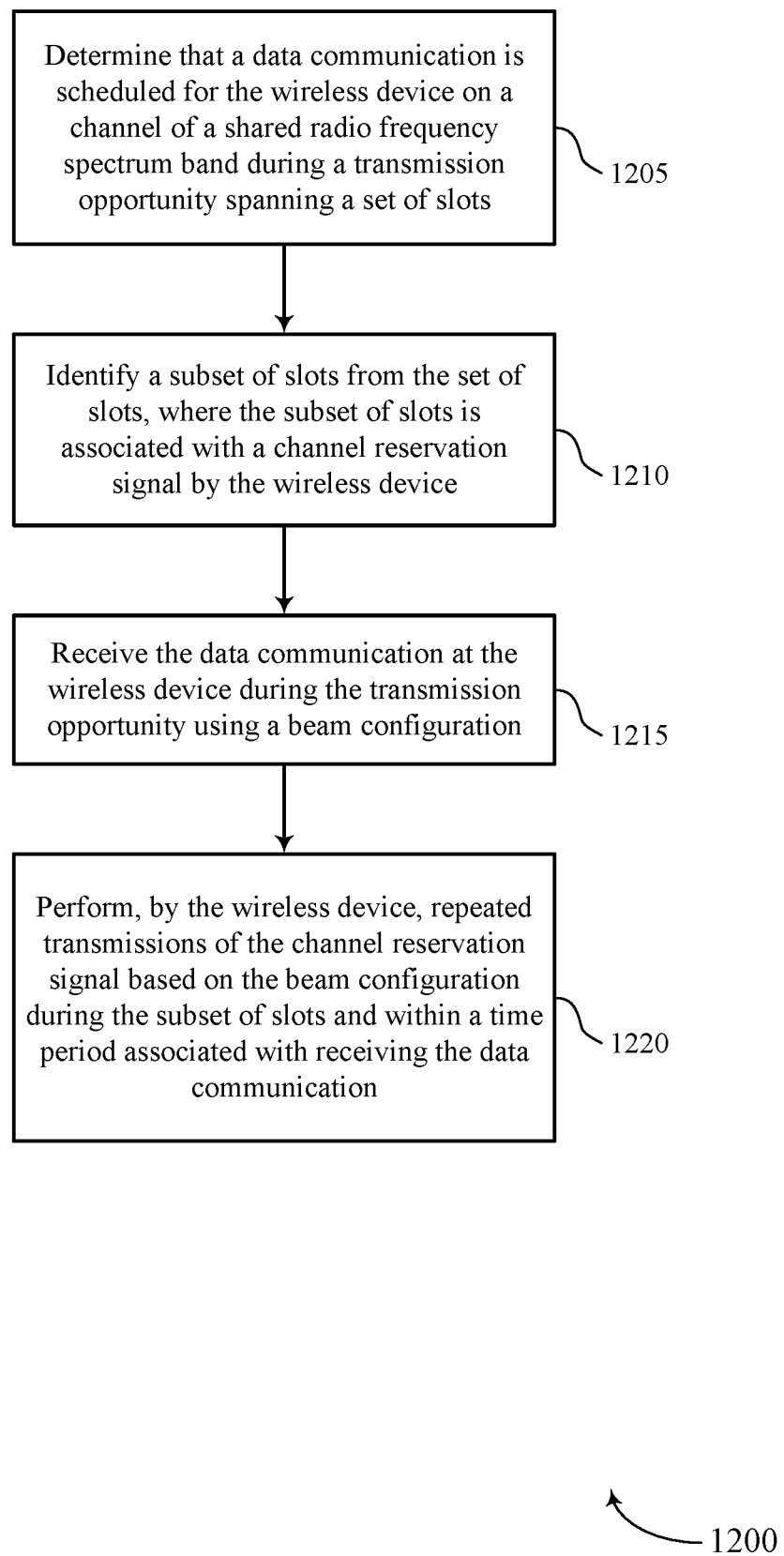
FIGS. 12 through 16 illustrate methods for reservation repetition for deafness avoidance in accordance with aspects of the present disclosure.

FIG. 12 shows a flowchart illustrating a method 1200 for reservation repetition for deafness avoidance in accordance with aspects of the present disclosure. The operations of method 1200 may be implemented by a UE 115 or base station 105 or its components as described herein. For example, the operations of method 1200 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1205 the UE 115 or base station 105 may determine that a data communication is scheduled for the wireless device on a channel of a shared radio frequency spectrum band during a TxOP spanning a plurality of slots. The operations of 1205 may be performed according to the methods described herein. In certain examples, aspects of the operations of 1205 may be performed by a data communication manager as described with reference to FIGS. 7 through 9.

At 1210 the UE 115 or base station 105 may identify a subset of slots from the plurality of slots, wherein the subset of slots is associated with a channel reservation signal by the wireless device. The operations of 1210 may be performed according to the methods described herein. In certain examples, aspects of the operations of 1210 may be performed by a TxOP manager as described with reference to FIGS. 7 through 9.

At 1215 the UE 115 or base station 105 may receive the data communication at the wireless device during the TxOP using a beam configuration. The operations of 1215 may be performed according to the methods described herein. In certain examples, aspects of the operations of 1215 may be performed by a data communication manager as described with reference to FIGS. 7 through 9.

At 1220 the UE 115 or base station 105 may perform, by the wireless device, repeated transmissions of the channel reservation signal based at least in part on the beam configuration during the subset of slots and within a time period associated with receiving the data communication. The operations of 1220 may be performed according to the methods described herein. In certain examples, aspects of the operations of 1220 may be performed by a channel reservation signal manager as described with reference to FIGS. 7 through 9.

Figure 13:
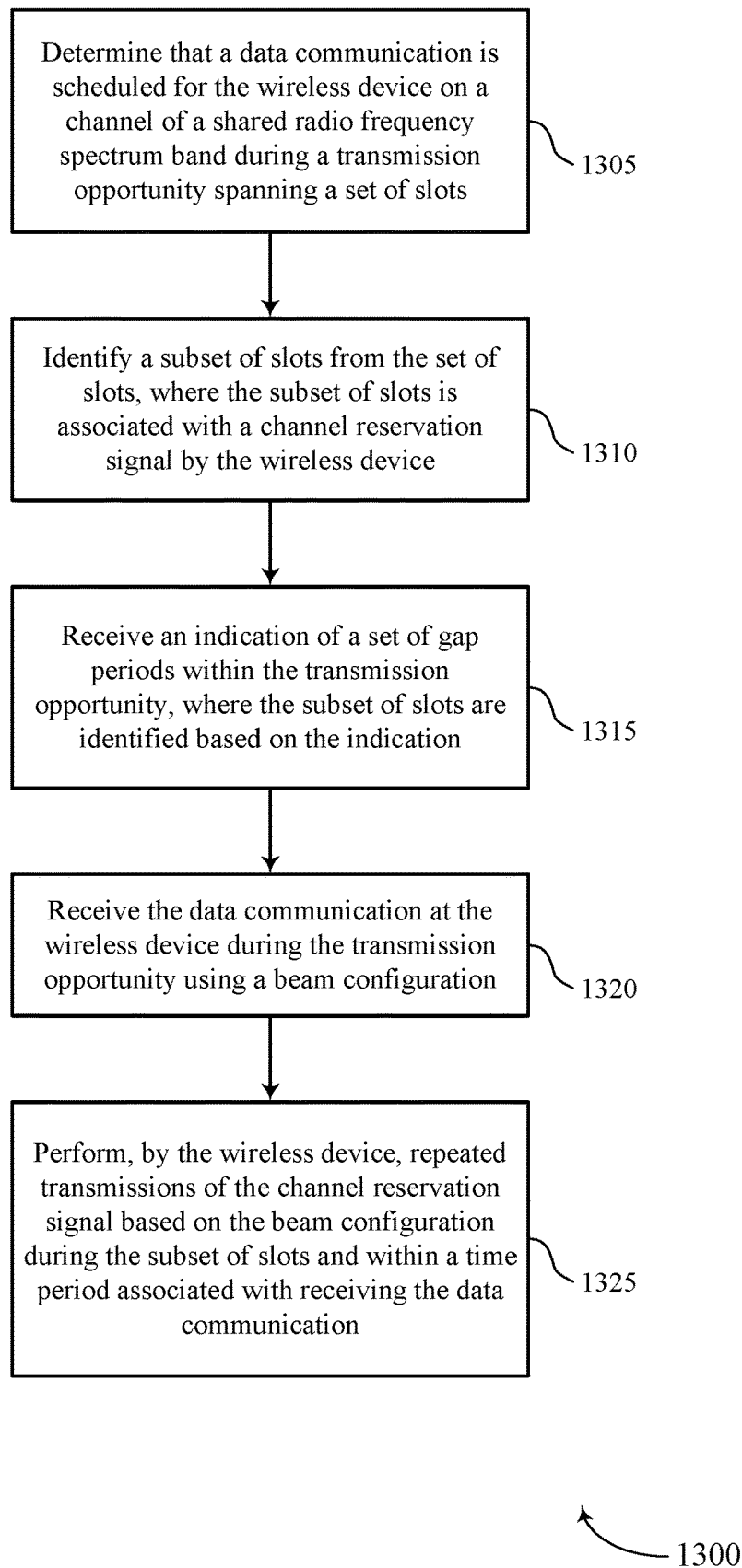

FIG. 13 shows a flowchart illustrating a method 1300 for reservation repetition for deafness avoidance in accordance with aspects of the present disclosure. The operations of method 1300 may be implemented by a UE 115 or base station 105 or its components as described herein. For example, the operations of method 1300 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1305 the UE 115 or base station 105 may determine that a data communication is scheduled for the wireless device on a channel of a shared radio frequency spectrum band during a TxOP spanning a plurality of slots. The operations of 1305 may be performed according to the methods described herein. In certain examples, aspects of the operations of 1305 may be performed by a data communication manager as described with reference to FIGS. 7 through 9.

At 1310 the UE 115 or base station 105 may identify a subset of slots from the plurality of slots, wherein the subset of slots is associated with a channel reservation signal by the wireless device. The operations of 1310 may be performed according to the methods described herein. In certain examples, aspects of the operations of 1310 may be performed by a TxOP manager as described with reference to FIGS. 7 through 9.

At 1315 the UE 115 or base station 105 may receive an indication of a plurality of gap periods within the TxOP, wherein the subset of slots are identified based at least in part on the indication. The operations of 1315 may be performed according to the methods described herein. In certain examples, aspects of the operations of 1315 may be performed by an indication manager as described with reference to FIGS. 7 through 9.

At 1320 the UE 115 or base station 105 may receive the data communication at the wireless device during the TxOP using a beam configuration. The operations of 1320 may be performed according to the methods described herein. In certain examples, aspects of the operations of 1320 may be performed by a data communication manager as described with reference to FIGS. 7 through 9.

At 1325 the UE 115 or base station 105 may perform, by the wireless device, repeated transmissions of the channel reservation signal based at least in part on the beam configuration during the subset of slots and within a time period associated with receiving the data communication. The operations of 1325 may be performed according to the methods described herein. In certain examples, aspects of the operations of 1325 may be performed by a channel reservation signal manager as described with reference to FIGS. 7 through 9.

Figure 14:
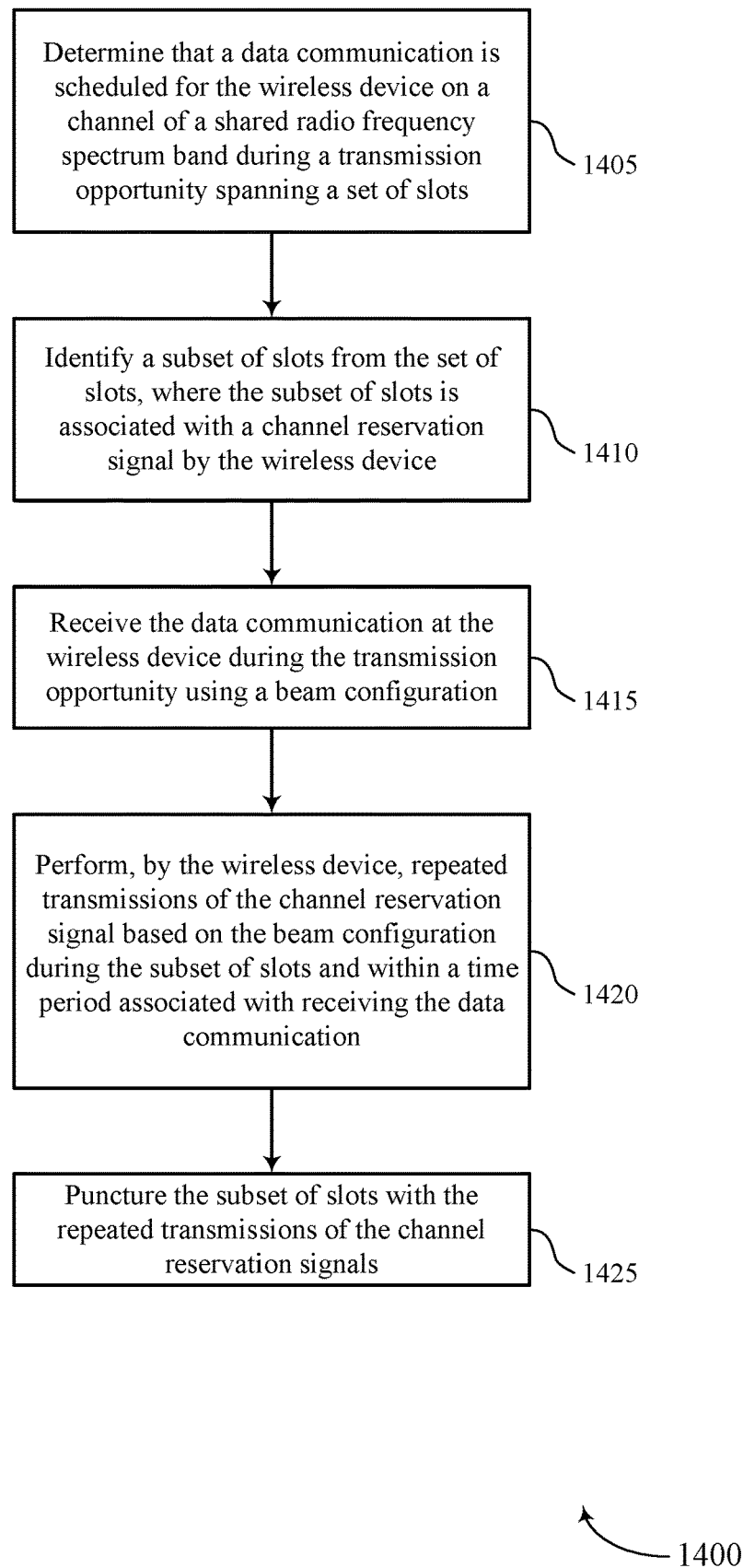

FIG. 14 shows a flowchart illustrating a method 1400 for reservation repetition for deafness avoidance in accordance with aspects of the present disclosure. The operations of method 1400 may be implemented by a UE 115 or base station 105 or its components as described herein. For example, the operations of method 1400 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1405 the UE 115 or base station 105 may determine that a data communication is scheduled for the wireless device on a channel of a shared radio frequency spectrum band during a TxOP spanning a plurality of slots. The operations of 1405 may be performed according to the methods described herein. In certain examples, aspects of the operations of 1405 may be performed by a data communication manager as described with reference to FIGS. 7 through 9.

At 1410 the UE 115 or base station 105 may identify a subset of slots from the plurality of slots, wherein the subset of slots is associated with a channel reservation signal by the wireless device. The operations of 1410 may be performed according to the methods described herein. In certain examples, aspects of the operations of 1410 may be performed by a TxOP manager as described with reference to FIGS. 7 through 9.

At 1415 the UE 115 or base station 105 may receive the data communication at the wireless device during the TxOP using a beam configuration. The operations of 1415 may be performed according to the methods described herein. In certain examples, aspects of the operations of 1415 may be performed by a data communication manager as described with reference to FIGS. 7 through 9.

At 1420 the UE 115 or base station 105 may perform, by the wireless device, repeated transmissions of the channel reservation signal based at least in part on the beam configuration during the subset of slots and within a time period associated with receiving the data communication. The operations of 1420 may be performed according to the methods described herein. In certain examples, aspects of the operations of 1420 may be performed by a channel reservation signal manager as described with reference to FIGS. 7 through 9.

At 1425 the UE 115 or base station 105 may puncture the subset of slots with the repeated transmissions of the channel reservation signals. The operations of 1425 may be performed according to the methods described herein. In certain examples, aspects of the operations of 1425 may be performed by a puncturing manager as described with reference to FIGS. 7 through 9.

Figure 15:
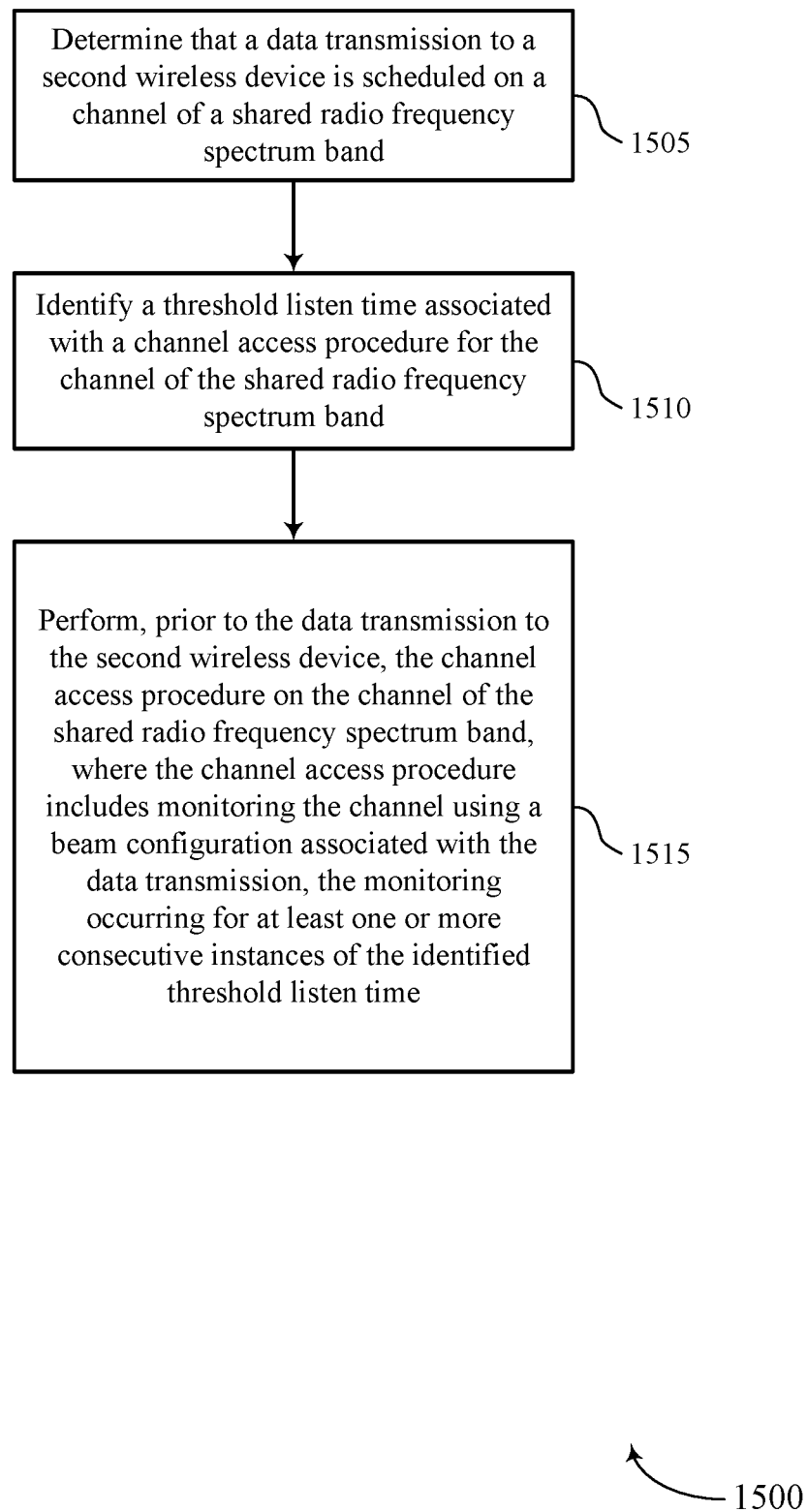

FIG. 15 shows a flowchart illustrating a method 1500 for reservation repetition for deafness avoidance in accordance with aspects of the present disclosure. The operations of method 1500 may be implemented by a UE 115 or base station 105 or its components as described herein. For example, the operations of method 1500 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1505 the UE 115 or base station 105 may determine that a data transmission to a second wireless device is scheduled on a channel of a shared radio frequency spectrum band. The operations of 1505 may be performed according to the methods described herein. In certain examples, aspects of the operations of 1505 may be performed by a data communication manager as described with reference to FIGS. 7 through 9.

At 1510 the UE 115 or base station 105 may identify a threshold listen time associated with a channel access procedure for the channel of the shared radio frequency spectrum band. The operations of 1510 may be performed according to the methods described herein. In certain examples, aspects of the operations of 1510 may be performed by a listen time manager as described with reference to FIGS. 7 through 9.

At 1515 the UE 115 or base station 105 may perform, prior to the data transmission to the second wireless device, the channel access procedure on the channel of the shared radio frequency spectrum band, wherein the channel access procedure comprises monitoring the channel using a beam configuration associated with the data transmission, the monitoring occurring for at least one or more consecutive instances of the identified threshold listen time. The operations of 1515 may be performed according to the methods described herein. In certain examples, aspects of the operations of 1515 may be performed by a channel access procedure manager as described with reference to FIGS. 7 through 9.

Figure 16:
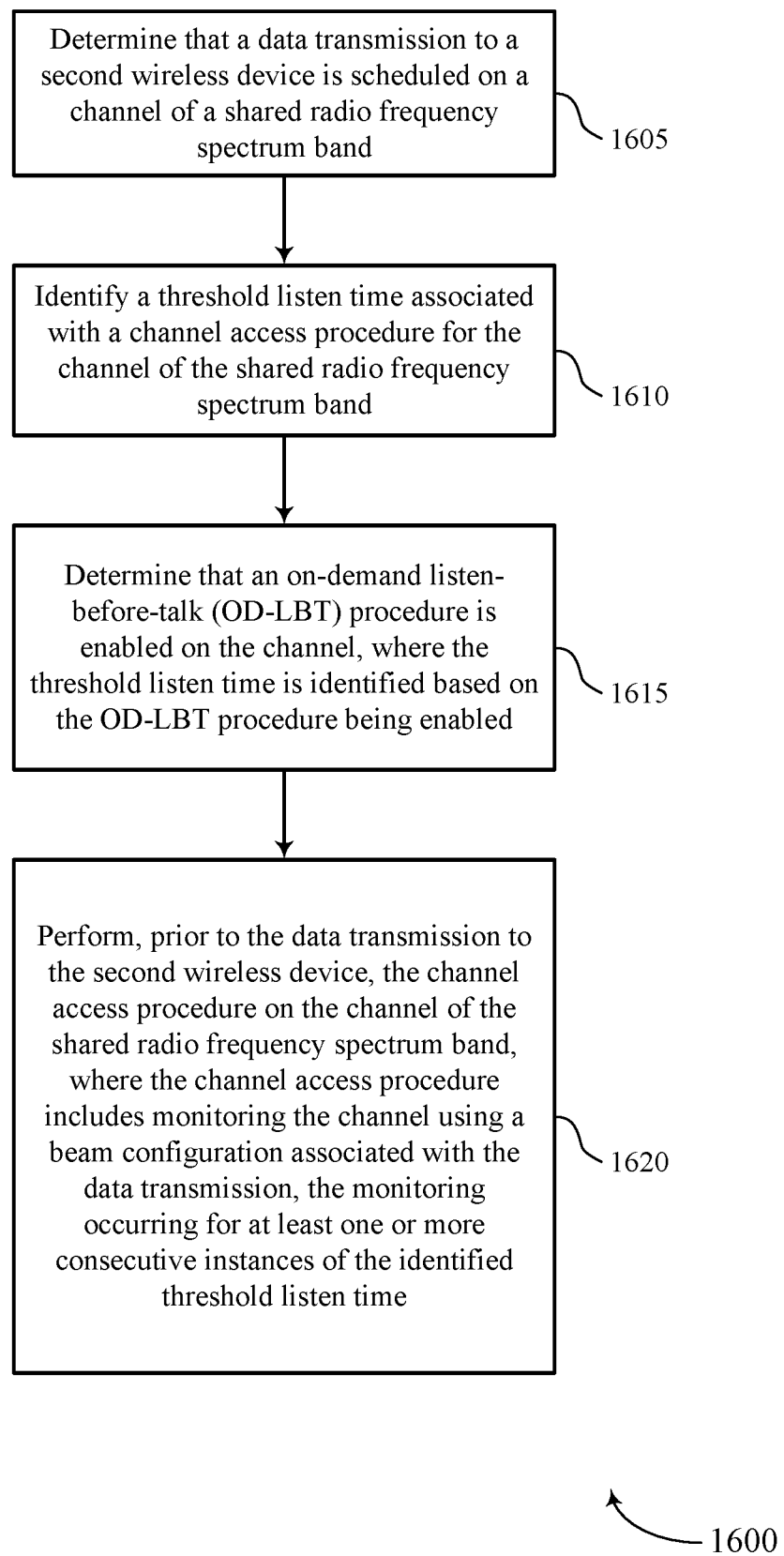

FIG. 16 shows a flowchart illustrating a method 1600 for reservation repetition for deafness avoidance in accordance with aspects of the present disclosure. The operations of method 1600 may be implemented by a UE 115 or base station 105 or its components as described herein. For example, the operations of method 1600 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1605 the UE 115 or base station 105 may determine that a data transmission to a second wireless device is scheduled on a channel of a shared radio frequency spectrum band. The operations of 1605 may be performed according to the methods described herein. In certain examples, aspects of the operations of 1605 may be performed by a data communication manager as described with reference to FIGS. 7 through 9.

At 1610 the UE 115 or base station 105 may identify a threshold listen time associated with a channel access procedure for the channel of the shared radio frequency spectrum band. The operations of 1610 may be performed according to the methods described herein. In certain examples, aspects of the operations of 1610 may be performed by a listen time manager as described with reference to FIGS. 7 through 9.

At 1615 the UE 115 or base station 105 may determine that an OD-LBT procedure is enabled on the channel, wherein the threshold listen time is identified based at least in part on the OD-LBT procedure being enabled. The operations of 1615 may be performed according to the methods described herein. In certain examples, aspects of the operations of 1615 may be performed by an LBT manager as described with reference to FIGS. 7 through 9.

At 1620 the UE 115 or base station 105 may perform, prior to the data transmission to the second wireless device, the channel access procedure on the channel of the shared radio frequency spectrum band, wherein the channel access procedure comprises monitoring the channel using a beam configuration associated with the data transmission, the monitoring occurring for at least one or more consecutive instances of the identified threshold listen time. The operations of 1620 may be performed according to the methods described herein. In certain examples, aspects of the operations of 1620 may be performed by a channel access procedure manager as described with reference to FIGS. 7 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining that a data communication is scheduled for a wireless device on a channel of a shared radio frequency spectrum band during a transmission opportunity spanning a plurality of slots;
   identifying a subset of slots from the plurality of slots, wherein the subset of slots is associated with a channel reservation signal by the wireless device;
   receiving the data communication at the wireless device during the transmission opportunity using a beam configuration; and
   performing, by the wireless device, repeated transmissions of the channel reservation signal based at least in part on the beam configuration during the subset of slots and within a time period associated with receiving the data communication.

2. The method of claim 1, further comprising:
   receiving an indication of a plurality of gap periods within the transmission opportunity, wherein the subset of slots are identified based at least in part on the indication.

3. The method of claim 2, wherein the indication is received in at least one of: a control signal received from a base station, or in a radio resource control (RRC) signal received from the base station, or in a multi-subframe downlink grant received from the base station.

4. The method of claim 1, further comprising:
   puncturing the subset of slots with the repeated transmissions of the channel reservation signal.

5. The method of claim 4, further comprising:
   performing an on-demand listen-before-talk (OD-LBT) procedure on the channel prior to puncturing the subset of slots.

6. The method of claim 1, further comprising:
   receiving a request for a plurality of gap periods configured within the transmission opportunity, wherein the subset of slots are identified based at least in part on the request.

7. The method of claim 6, wherein the request is received in at least one of: a control signal received from a base station, or in a radio resource control (RRC) signal received from the base station, or in a multi-subframe uplink grant received from the base station.

8. The method of claim 6, wherein the request is received based at least in part on at least one of: a listen-before-talk (LBT) procedure performed on the channel, a transmission rank associated with the data communication, or a combination thereof.

9. The method of claim 1, further comprising:
   identifying a new radio (NR) frame structure associated with the data communication, wherein the subset of slots are identified based at least in part on the NR frame structure.

10. The method of claim 1, further comprising:
    multiplexing in at least one of: a time domain, a frequency domain, or a combination thereof, one or more transmissions of uplink control information (UCI) with the repeated transmissions of the channel reservation signal.

11. The method of claim 1, further comprising:
    multiplexing in at least one of: a time domain, a frequency domain, or a combination thereof, one or more transmissions of downlink control signaling with the repeated transmissions of the channel reservation signal.

12. The method of claim 11, wherein the downlink control signaling comprises at least one of: a physical downlink control channel (PDCCH) grant, or an override of a previous PDCCH grant, or a new or updated modulation and coding scheme (MCS), or a new or updated rank indicator, or a new or updated transmission opportunity length, or a new or updated frame format indicator, or a new or updated resource allocation, or combinations thereof.

13. The method of claim 1, further comprising:
    configuring each instance of the channel reservation signal with an end time period associated with the data communication, wherein the end time period comprises at least one of: an absolute time identifying an end of the data communication or a relative time period based at least in part on a timing of the transmission of the channel reservation signal with respect to the end of the data communication.

14. The method of claim 1, further comprising:
    configuring each instance of the channel reservation signal with at least one of: an acceptable interference level indication, an acceptable interference rank indication, or a combination thereof.

15. The method of claim 1, wherein the beam configuration for the repeated transmissions of the channel reservation signal comprises the beam configuration used for the data communication.

16. The method of claim 1, wherein the beam configuration for the repeated transmissions of the channel reservation signal comprises a different beam configuration used for the data communication.

17. A method for wireless communication at a first wireless device, comprising:
   determining that a data transmission to a second wireless device is scheduled on a channel of a shared radio frequency spectrum band;
   identifying a threshold listen time associated with a channel access procedure for the channel of the shared radio frequency spectrum band;
   monitoring the channel for at least one or more consecutive instances of the identified threshold listen time using a beam configuration associated with the data transmission;
   determining that the channel is clear based at least in part on the monitoring; and
   performing, prior to the data transmission to the second wireless device, the channel access procedure on the channel of the shared radio frequency spectrum band, wherein the channel access procedure comprises transmitting a plurality of channel reservation signals on the channel during a single transmission opportunity period based at least in part determining that the channel is clear.

18. The method of claim 17, further comprising:
   determining that an on-demand listen-before-talk (OD-LBT) procedure is enabled on the channel, wherein the threshold listen time is identified based at least in part on the OD-LBT procedure being enabled.

19. The method of claim 17, further comprising:
   determining that a new beam configuration is being used for the channel access procedure, wherein the threshold listen time is identified based at least in part on the new beam configuration.

20. The method of claim 17, further comprising:
   receiving an indication from a third wireless device that an on-demand listen-before-talk (OD-LBT) procedure is enabled on the channel, wherein the threshold listen time is identified based at least in part on the OD-LBT procedure being enabled.

21. The method of claim 20, wherein the indication is received during the OD-LBT procedure of the third wireless device, and wherein the indication identifies the threshold listen time.

22. The method of claim 17, wherein monitoring the channel comprises monitoring the channel for a threshold amount of energy.

23. The method of claim 17, wherein a first threshold listen time is identified when the first wireless device comprises a base station and a second threshold listen time is identified when the first wireless device comprises a user equipment (UE).

24. The method of claim 17, further comprising:
   monitoring the channel over a plurality of slots.

25. An apparatus for wireless communication, comprising:
   a processor;
   memory in electronic communication with the processor; and
   instructions stored in the memory and executable by the processor to cause the apparatus to:
      determine that a data communication is scheduled for a wireless device on a channel of a shared radio frequency spectrum band during a transmission opportunity spanning a plurality of slots;
      identify a subset of slots from the plurality of slots, wherein the subset of slots is associated with a channel reservation signal by the wireless device;
      receive the data communication at the wireless device during the transmission opportunity using a beam configuration; and
      perform, by the wireless device, repeated transmissions of the channel reservation signal based at least in part on the beam configuration during the subset of slots and within a time period associated with receiving the data communication.

26. The apparatus of claim 25, wherein the instructions are further executable by the processor to cause the apparatus to:
   receive an indication of a plurality of gap periods within the transmission opportunity, wherein the subset of slots are identified based at least in part on the indication.

27. The apparatus of claim 26, wherein the indication is received in at least one of: a control signal received from a base station, or in a radio resource control (RRC) signal received from the base station, or in a multi-subframe downlink grant received from the base station.

28. An apparatus for wireless communication, comprising:
   a processor;
   memory in electronic communication with the processor; and
   instructions stored in the memory and executable by the processor to cause the apparatus to:
      determine that a data transmission to a second wireless device is scheduled on a channel of a shared radio frequency spectrum band;
      identify a threshold listen time associated with a channel access procedure for the channel of the shared radio frequency spectrum band;
      monitor the channel for at least one or more consecutive instances of the identified threshold listen time using a beam configuration associated with the data transmission;
      determine that the channel is clear based at least in part on the monitoring; and
      perform, prior to the data transmission to the second wireless device, the channel access procedure on the channel of the shared radio frequency spectrum band, wherein the channel access procedure comprises transmitting a plurality of channel reservation signals on the channel during a single transmission opportunity period based at least in part determining that the channel is clear.

29. The apparatus of claim 28, wherein the instructions are further executable by the processor to cause the apparatus to:
   determine that an on-demand listen-before-talk (OD-LBT) procedure is enabled on the channel, wherein the threshold listen time is identified based at least in part on the OD-LBT procedure being enabled.

30. The apparatus of claim 28, wherein the instructions are further executable by the processor to cause the apparatus to:

determine that a new beam configuration is being used for the channel access procedure, wherein the threshold listen time is identified based at least in part on the new beam configuration.

* * * * *